(12) United States Patent
Berger et al.

(10) Patent No.: US 7,877,511 B1
(45) Date of Patent: Jan. 25, 2011

(54) METHOD AND APPARATUS FOR ADAPTIVE SERVICES NETWORKING

(75) Inventors: Michael A. Berger, Manchester, NH (US); Robert T. Curley, Hopkinton, MA (US); Daniel J. Dietterich, Acton, MA (US); JC Ferguson, Harvard, MA (US); Michael J. Homberg, Westborough, MA (US); Benjamin E. McCann, Acton, MA (US); Jonathan C. Nicklin, Cambridge, MA (US); David Porter, Littleton, MA (US); Suchi Raman, Winchester, MA (US); Craig S. Rasmussen, Arlington, MA (US); Michael J. Soha, Chelmsford, MA (US); Thomas J. Teixeira, Harvard, MA (US); Bryan T. Whitmore, Fitchburg, MA (US); Leonard F. Wisniewski, Danvers, MA (US); Chin-Cheng Wu, Carlisle, MA (US)

(73) Assignee: F5 Networks, Inc., Seattle, WA (US)

( * ) Notice: Subject to any disclaimer, the term of this patent is extended or adjusted under 35 U.S.C. 154(b) by 1490 days.

(21) Appl. No.: 10/756,189

(22) Filed: Jan. 13, 2004

Related U.S. Application Data

(60) Provisional application No. 60/439,763, filed on Jan. 13, 2003, provisional application No. 60/498,475, filed on Aug. 28, 2003.

(51) Int. Cl.
*G06F 15/16* (2006.01)
(52) U.S. Cl. .................. 709/242; 709/201; 709/203; 709/212; 709/213; 709/246
(58) Field of Classification Search ................ 709/229, 709/217, 201, 203, 212, 213, 242, 246; 707/201
See application file for complete search history.

(56) References Cited

U.S. PATENT DOCUMENTS 4,993,030 A 2/1991 Krakauer et al.

(Continued)

FOREIGN PATENT DOCUMENTS

AU 2003300350 A1 7/2004

(Continued)

OTHER PUBLICATIONS

"Auspex Storage Architecture Guide," Second Edition, 2001, Auspex Systems, Inc., www.ausoex.com, last accessed on Dec. 30, 2002.

(Continued)

*Primary Examiner*—Djenane M Bayard
(74) *Attorney, Agent, or Firm*—Nixon Peabody LLP

(57) ABSTRACT

Methods and apparatus provide an adaptive load balancer that presents a virtual data system to client computer systems. The virtual data system provides access to an aggregated set of data, such as files or web service objects, available from a plurality of server data systems respectively operating within a plurality of server computer systems. The adaptive load balancer receives a client data access transaction from a client computer system that specifies a data access operation to be performed relative to the virtual data system presented to the client computer system. The adaptive load balancer processes the client data access transaction in relation to metadata associated with the virtual data system to provide access to the file or service object within a server computer system, or to access the metadata. The adaptive load balancer can work in conjunction with other adaptive load balancers to dynamically adjust to demands for access to data by replicating and migrating data such as files or service objects as needed between the server computer systems to accommodate data access demands.

35 Claims, 16 Drawing Sheets

U.S. PATENT DOCUMENTS

| | | | |
|---|---|---|---|
| 5,218,695 A | 6/1993 | Noveck et al. |
| 5,473,362 A | 12/1995 | Fitzgerald et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,649,194 A | 7/1997 | Miller et al. |
| 5,649,200 A | 7/1997 | Leblang et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,078,929 A | 6/2000 | Rao |
| 6,085,234 A | 7/2000 | Pitts et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,223,206 B1 | 4/2001 | Dan et al. |
| 6,233,648 B1 | 5/2001 | Tomita |
| 6,256,031 B1 | 7/2001 | Meijer et al. |
| 6,289,345 B1 | 9/2001 | Yasue |
| 6,308,162 B1 | 10/2001 | Ouimet et al. |
| 6,324,581 B1 | 11/2001 | Xu et al. |
| 6,339,785 B1 | 1/2002 | Feigenbaum |
| 6,349,343 B1 | 2/2002 | Foody et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,438,595 B1 | 8/2002 | Blumenau et al. |
| 6,477,544 B1 | 11/2002 | Bolosky et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,553,352 B2 | 4/2003 | Delurgio et al. |
| 6,556,997 B1 | 4/2003 | Levy |
| 6,556,998 B1 | 4/2003 | Mukherjee et al. |
| 6,601,101 B1 | 7/2003 | Lee et al. |
| 6,612,490 B1 | 9/2003 | Herrendoerfer et al. |
| 6,721,794 B2 | 4/2004 | Taylor et al. |
| 6,742,035 B1 | 5/2004 | Zayas et al. |
| 6,748,420 B1 * | 6/2004 | Quatrano et al. ............ 709/205 |
| 6,757,706 B1 | 6/2004 | Dong et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,889,249 B2 | 5/2005 | Miloushev et al. |
| 6,922,688 B1 | 7/2005 | Frey, Jr. |
| 6,938,059 B2 | 8/2005 | Tamer et al. |
| 6,959,373 B2 | 10/2005 | Testardi |
| 6,973,549 B1 | 12/2005 | Testardi |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,013,379 B1 | 3/2006 | Testardi |
| 7,051,112 B2 | 5/2006 | Dawson |
| 7,072,917 B2 | 7/2006 | Wong et al. |
| 7,113,962 B1 | 9/2006 | Kee et al. |
| 7,127,556 B2 | 10/2006 | Blumenau et al. |
| 7,146,524 B2 | 12/2006 | Patel et al. |
| 7,155,466 B2 | 12/2006 | Rodriguez et al. |
| 7,173,929 B1 | 2/2007 | Testardi |
| 7,194,579 B2 | 3/2007 | Robinson et al. |
| 7,280,536 B2 | 10/2007 | Testardi |
| 7,284,150 B2 | 10/2007 | Ma et al. |
| 7,293,099 B1 | 11/2007 | Kalajan |
| 7,293,133 B1 | 11/2007 | Colgrove et al. |
| 7,383,288 B2 | 6/2008 | Miloushev et al. |
| 7,406,484 B1 | 7/2008 | Srinivasan et al. |
| 7,509,322 B2 | 3/2009 | Miloushev et al. |
| 7,512,673 B2 | 3/2009 | Miloushev et al. |
| 7,562,110 B2 | 7/2009 | Miloushev et al. |
| 7,624,109 B2 | 11/2009 | Testardi |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 * | 5/2002 | Shima et al. ................ 707/100 |
| 2002/0083118 A1 * | 6/2002 | Sim .......................... 709/105 |
| 2002/0120763 A1 | 8/2002 | Miloushev et al. |
| 2002/0133491 A1 | 9/2002 | Sim et al. |
| 2002/0138502 A1 | 9/2002 | Gupta |
| 2002/0147630 A1 | 10/2002 | Rose et al. |
| 2002/0161911 A1 | 10/2002 | Pinckney, III et al. |
| 2003/0009429 A1 | 1/2003 | Jameson |
| 2003/0028514 A1 | 2/2003 | Lord et al. |
| 2003/0033308 A1 | 2/2003 | Patel et al. |
| 2003/0115218 A1 | 6/2003 | Bobbitt et al. |
| 2003/0135514 A1 | 7/2003 | Patel et al. |
| 2003/0171978 A1 | 9/2003 | Jenkins et al. |
| 2004/0003266 A1 * | 1/2004 | Moshir et al. ............... 713/191 |
| 2004/0006575 A1 | 1/2004 | Visharam et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0054777 A1 | 3/2004 | Ackaouy et al. |
| 2004/0098383 A1 | 5/2004 | Tabellion et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133652 A1 | 7/2004 | Miloushev et al. |
| 2004/0236798 A1 | 11/2004 | Srinivasan et al. |
| 2005/0021615 A1 | 1/2005 | Arnott et al. |
| 2005/0050107 A1 | 3/2005 | Mane et al. |
| 2005/0246393 A1 * | 11/2005 | Coates et al. ............... 707/200 |
| 2005/0289109 A1 | 12/2005 | Arrouye et al. |
| 2006/0080353 A1 | 4/2006 | Miloushev et al. |
| 2006/0112151 A1 * | 5/2006 | Manley et al. .............. 707/201 |
| 2006/0161518 A1 | 7/2006 | Lacapra |
| 2006/0167838 A1 | 7/2006 | Lacapra |
| 2006/0184589 A1 * | 8/2006 | Lees et al. .................. 707/201 |
| 2006/0200470 A1 | 9/2006 | Lacapra et al. |
| 2006/0230265 A1 | 10/2006 | Krishna |
| 2007/0024919 A1 | 2/2007 | Wong et al. |

FOREIGN PATENT DOCUMENTS

| | | | |
|---|---|---|---|
| CA | 2512312 A1 | 7/2004 |
| EP | 0 738 970 A | 10/1996 |

| | | | |
|---|---|---|---|
| JP | 63010250 A | 1/1988 | |
| JP | 6-332782 A | 12/1994 | |
| JP | 08-328760 A | 12/1996 | |
| JP | 08-339355 | 12/1996 | |
| JP | 9016510 A | 1/1997 | |
| JP | 11282741 A1 | 10/1999 | |
| WO | WO 02/056181 A3 | 7/2002 | |
| WO | WO 2004/061605 A2 | 7/2004 | |
| WO | WO 2008/130983 A1 | 10/2008 | |
| WO | WO 2008/147973 A2 | 12/2008 | |

OTHER PUBLICATIONS

"CSA Persistent File System Technology, Colorado Software" Architecture, Inc. White Paper, Jan. 1999, p. 1-3.
"Distributed File System: A Logical View of Physical Storage : White Paper," 1999, Microsoft Corp., www.microsoft.com, last accessed on Dec. 20, 2002.
"NERSC Tutorials: I/O on the Cray T3E," chapter 8, "Disk Striping," National Energy Research Scientific Computing Center (NERSC), http://hpcf.nersc.gov, last accessed on Dec. 27, 2002.
"Scaling Next Generation Web Infrastructure with Content-Intelligent Switching : White Paper," Apr. 2000, Alteon WebSystems, Inc., (now Nortel Networks).
"VERITAS SANPoint Foundation Suite(tm) and SANPoint Foundation(trn) Suite HA: New VERITAS Volume Management and File System Technology for Cluster Environments," Sep. 2001, VERITAS Software Corp.
"Windows Clustering Technologies—An Overview," Nov. 2000, Microsoft Corp., www.microsoft.com, last accessed on Dec. 30, 2002.
Anderson et al., "Serverless Network File System," in the 15th Symposium on Operating Systems Principles, Dec. 1995, Association for Computing Machinery, Inc.
Cabrera et al., "Swift: A Storage Architecture for Large Objects," Proceedings of the Eleventh IEEE Symposium on Mass Storage Systems, pp. 123-428, Oct. 1991.
Cabrera et al., "Swift: Using Distributed Disk Striping to Provide High I/O Data Rates," Computing Systems 4, 4 (Fall 1991), pp. 405-436.
Cabrera et al, "Using Data Striping in a Local Area Network," 1992, technical report No. UCSC-CRL-92-09 of the Computer & Information Sciences Department of University of California at Santa Cruz.
Callaghan et al., "NFS Version 3 Protocol Spcification," (RFC 1813), 1995, The Internet Engineering Task Force (IETF), www.ietf.org, last accessed on Dec. 30, 2002.
Carns et al., "PVFS: A Parallel File System for Linux Clusters," Proceedings of the 4th Annual Linux Showcase and Conference, pp. 317-327, Atlanta, Georgia, Oct. 2000, USENIX Association.
Cavale, M. R., "Introducing Microsoft Cluster Service (MSCS) in the Windows Server 2003," Microsoft Corporation, Nov. 2002.
English Translation of Notification of Reason(s) for Refusal for JP 2002-556371 (Dispatch Date: Jan. 22, 2007).
Fan, et al., "Summary Cache: A Scalable Wide—Area Web Cache Sharing Protocol,"Computer Communications Review, Association for Computing Machinery, New York, USA 28(4):254-265 (1998).
Farley, "Building Storage Networks," Jan. 2000, McGraw-Hill, ISBN 0072120509.
Gibson et al., "File Server Scaling with Network-Attached Secure Disks," in Proceedings of the ACM International Conference on Measurement and Modeling of Computer Systems (Sigmetrics '97), 1997, Association for Computing Machinery, Inc.
Gibson et g., "NASD Scalable Storage Systems," Jun. 1999, USENIX99, Extreme Linux Workshop, Monterey, California.
Hartman, "The Zebra Striped Network File System," 1994, Ph.D. dissertation submitted in the Graduate Division of the University of California at Berkeley.
Haskin et al., "The Tiger Shark File System," 1995, in proceedings of IEEE, Spring COMPCON, Santa Clara, CA, www.research.ibm.com, last accessed on Dec. 30, 2002.
Hwang et al., Designing SSI Clusters with Hierarchical Checkpointing and Single I/O Space, IEEE Concurrency, pp. 60-69, Jan.-Mar. 1999.

International Search Report for International Patent Application No. PCT/US02/00720 (Jul. 8, 2004).
Karamanolis et al., "An Architecture for Scalable and Manageable File Services," HPL-2001-173 p. 1-14 (Jul. 26, 2001).
Kimball, C.E. et al., Automated Client-Side Integration of Distributed Application Servers, 13th LISA Conf., 1999.
Long et al., "Swift/RAID: A distributed RAID system," Computing Systems, vol. 7, pp. 333-359, Summer 1994.
Noghani et al., "A Novel Approach to reduce Latency on the Internet: 'Component-Based Download'," Proceedings of the Int'l Conf. on Internet Computing, Las Vegas, NV pp. 1-6 (2000).
Norton et al., "CIFS Protocol Version CIFS-Spec 0.9," 2001, Storage Networking Industry Association (SNIA), www.snia.org, last accessed on Mar. 26, 2001.
Patterson et al., "A case for redundant arrays of inexpensive disks (RAID)," Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings," Comm. Of the ACM, vol. 33, No. 6, Jun. 1990.
Peterson, "Introducing Storage Area Networks," Feb. 1998, InfoStor, \www.infostor.com, last accessed on Dec. 20, 2002.
Preslan et al., "Scalability and Failure Recovery in a Linux Cluster File System," in Proceedings of the 4th Annual Linux Showcase & Conference, Atlanta, Georgia, Oct. 10-14, 2000, www.usenix.org, last accessed on Dec. 20, 2002.
Rodriguez et al., "Parallel-access for Mirror Sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph -p. 868, col. 1, paragraph 1.
Savage, et al., "AFRAID- A Frequently Redundant Array of Inexpensive Disks," 1996 USENIX Technical Conf., San Diego, California, Jan. 22-26, 1996.
Soltis et al., The Design and Performance of Shared Disk File System for IRIX, 6th NASA Goddard Space Flight Center Conf. on Mass Storage & Technologies, IEEE Symposium on Mass Storage Systems, p. 1-17 (Mar. 1998).
Sorenson, K.M., "Installation and Administration: Kimberlite Cluster Version 1.1.0, Rev. D." Mission Critical Linux, http://oss.missioncriticallinux.com/kimberlite/kimbetlite.pdf.
Stakutis, "Benefits of SAN-based fde system sharing," Jul. 2000, InfoStor, www.infostor.com, last accessed on Dec. 30, 2002.
Thekkath et al., "Frangipani: A Scalable Distributed File System," in Proceedings of the 16th ACM Symposium on Operating Systems Principles, Oct. 1997, Association for Computing Machinery, Inc.
Wilkes, J., et al., "The HP AutoRAID Hierarchical Storage System," ACM Transactions on Computer Systems, vol. 14, No. 1, Feb. 1996.
Zayas, "AFS-3 Programmer's Reference: Architectural Overview," Transarc Corp., version 1.0 of Sep. 2, 1991, doc. No. FS-00-D160.
Rsync, "Welcome to the RSYNC Web Pages, " Retrieved from the Internet URL: http://samba.anu.edu.au/rsync/ (Retrieved on Dec. 18, 2009).
Aguilera et al., "Improving recoverability in multi-tier storage systems," International Conference on Dependable Systems and Networks (DSN-2007), Edinburgh, Scotland, Jun. 2007, 10 pages.
Anderson, Darrell C. et al., "Interposed Request Routing for Scalable Network Storage," ACM Transactions on Computer Systems 20(1):1-24 (Feb. 2002).
Apple, Inc. "Tiger Developer Overview Series: Working with Spotlight" Nov. 23, 2004, www.apple.com using www.archive.org <http://web.archive.org/web/20041123005335/developer.apple.com/macosx/tiger/spotlight.html>, pp. 1-6.
International Search Report for International Patent Application No. PCT/US03/41202 (Sep. 15, 2005).
International Search Report for International Patent Application No. PCT/US2008/060449 (Apr. 9, 2008).
International Search Report for International Patent Application No. PCT/US2008/064677 (Sep. 6, 2009).
International Search Report for International Patent Application No. PCT/US 2008/083117 (Jun. 23, 2009).

Katsurashima et al., "NAS Switch: A Novel CIFS Server Virtualization," Proceedings. 20th IEEE/11th NASA Goddard Conference on Mass Storage Systems and Technologies, 2003 (MSST 2003), Apr. 2003.

Kohl et al., "The Kerberos Network Authentication Service (V5)," RFC 1510, Sep. 1993. (http://www.ietf.org/rfc/rfc1510.txt?number=1510.

"How DFS Works: Remote File Systems," Distributed File System (DFS) Technical Reference, retrieved from the Internet on Feb. 13, 2009: URL:http://technetmicrosoft.com/en-us/library/cc782417.aspx>(2003).

Apple, Inc., Transcription of "Mac OS X Tiger Keynote Intro. Part 2" Jun. 2004, www.youtube.com <http://www.youtube.com/watch?v=zSBJwEmRJbY>, (with snapshots) pp. 1-6.

\* cited by examiner

METHOD AND APPARATUS FOR ADAPTIVE SERVICES NETWORKING

CLAIM TO BENEFIT OF EARLIER FILED U.S. PROVISIONAL APPLICATIONS

This utility Patent Application claims the benefit of the filing date of the following earlier filed U.S. Provisional Patent Applications:

1) "METHODS AND APPARATUS FOR ADAPTIVE SERVICES NETWORKING" filed Jan. 13, 2003 having U.S. Ser. No. 60/439,763; and 2) "METHODS AND APPARATUS FOR INSERTING A FILE SERVER LOAD BALANCING DEVICE INTO A NETWORK" filed Aug. 28, 2003 having U.S. Ser. No. 60/498,475.

These utility Patent Applications share co-inventorship with this referenced Provisional Patent Application and are assigned to the same assignee. The entire teachings and contents of these referenced Provisional Patent Applications are hereby incorporated herein by reference in their entirety.

BACKGROUND

Conventional computer networking environments support the exchange of information between many interconnected computer systems. In a typical conventional computer networking environment, one or more client computer systems operate client software applications that transmit data access requests using a variety of data communications protocols over the computer network to server computer systems (i.e., servers) for receipt by server software applications executing on those servers. The server software applications receive the client data access requests and process these requests to access (e.g., read and/or write) data stored within data storage systems, such as disk drives or other mass storage systems, coupled to the server computer systems. The server computer systems transmit the requested data in a server response back to the client computer systems for receipt by the client software applications. In this manner, client/server software applications can effectively exchange data.

An example of popular conventional client/server information exchange system is provided by client and server software applications and an exchange protocol collectively referred to as the Network File System (NFS), originally developed by Sun Microsystems Inc. of Palo Alto, Calif., USA. Another example of such a conventional client-server system is the Common Internet File System (CIFS) created by Microsoft Corp. of Redmond, Wash., USA.

Generally, both NFS and CIFS provide respective client and server software portions (i.e., programs) that are typically integrated into the operating system of a computer to allow the computer system to export or remotely provide access to file and directories arranged within a file system managed by the operating system of that computer system. NFS is typically provided in standard distributions of the UNIX operating system, while CIFS provides similar functionality to that of NFS but for the Windows series of operating systems produced by Microsoft Corporation. Software developers have created implementations of NFS and CIFS that work in both UNIX and Windows-based computing system environments as well.

Other types of conventional data and information exchange systems include those provided by a set of applications and protocols collectively referred to as the World Wide Web. The World Wide Web most commonly operates over a collection of interconnected computer networks known as the Internet.

In a typical implementation of the World Wide Web, client computer systems operate a client software application referred to as a web browser. A typical web browser operates to provide hypertext transport protocol (HTTP) requests for documents referred to as web pages over the computer network to web server computer systems. A web server software application operating in the web server computer system can receive and process an HTTP web page request and can return or "serve" a corresponding web page document or file specified in the client request back to the requesting client computer system over the computer network for receipt by the web browser. The web browser can interpret markup language such as the hypertext markup language (HTML) or the extensible markup language (XML) within the web page in order to render information such as text, graphics or multimedia information to the user of the web browser on a display of the client computer system. A collection of related web page documents that clients can access at a common network address or domain name on a network is generally referred to as a web site.

In addition to simply accessing web pages, more recent conventional software and networking technologies that work in conjunction with protocols such as HTTP provide services, known as "web services", over a computer network such as the Internet. In a web services architecture, a server computer system can provide access to processing functionality using a scripting (i.e., programming) language called the Web Services Description Language (WSDL). A particular service expressed in WSDL can provide some processing functionality. Other computer systems that want to access this functionality can discover and invoke the web service offered by the server by submitting requests for the service to the server using XML data encoded in a Simple Object Access Protocol (SOAP) transferred to the server over HTTP. The XML/SOAP/HTTP web services architecture allows distributed computing servers to share processing functionality with other computers. When a server receives an invocation of a web service via an XML message encoded using SOAP, the server can decode the XML data, perform the service (i.e., some processing) on the data, and can return the result to the requesting computer system (i.e., a client).

Conventional server computer systems used in client/sever architectures are typically configured as powerful computer systems containing one or more high-performance central processing units or processors, significant amounts of memory, and provide access to high-capacity data storage systems for persistent storage of files, databases or other data. In many conventional configurations, a single server computer system and associated storage devices does not provide enough processing or storage capacity to meet the demand of a particular application. In such cases, system developers frequently provide for arrangements of a plurality of server computer systems within a tightly controlled local area network. Access to the collection of server computer systems can be controlled through networked data communications devices such as load balancers that can spread or distribute a series of client requests for data across the group of server computer systems such that no one particular server computer system is overburdened with client requests for data or services.

As an example, consider a popular web site that receives a large number of requests from client computer systems for web pages to be served from that site. In such a situation, an owner or developer of that web site may provide several server computer systems and respective server storage devices that are redundantly configured to each service client requests for web pages from that web site. A data communications device such as a specialized network router or switch can be configured as a load balancer to receive client requests from the computer network such as the Internet and distribute these requests evenly to each of the web servers. Since each web server contains its own duplicate copy of the web site information, each web server is able to service all client requests and thus the performance of the web site from the perspective of requesting client computer systems is improved by the existence of multiple server computer systems.

Typical conventional load balancing algorithms can evenly distribute client requests for data across the set of available server computer systems. More advanced conventional implementations of load balancing can account for server performance considerations and can distribute a higher number of client requests to servers that are experiencing better performance whereas servers that are experiencing worse performance can receive a proportionally smaller number of client requests.

Even more recent designs of information serving systems provide for "content aware" load balancers that perform content aware switching of requests for data or services. A server installation that provides a content aware load balancer allows different servers to store different information that may be requested by client computer systems. As client requests arrive at the content aware load balancing device, the content aware load balancer can inspect portions of the client request relating to the data being requested, such as portions of a Uniform Resource Locator (URL, and in response, can choose which particular server computer system should handle a particular client request based on the content (e.g., one or more portions of the URL) of the request itself, as well as taking into account the availability or performance of the servers. Conventional content aware request processing allows a web site administrator to configure the servers so that some servers only serve certain portions of data that clients may request while other servers serve other portions of data. Thus each server does not have to be identically configured.

SUMMARY OF THE INVENTION

Conventional mechanisms that provide the ability for computer systems to access data within a plurality of server computer systems may experience a variety of deficiencies. In conventional arrangements that do not use content aware switching, all servers must be identically configured since a conventional load balancer may distribute any client request for processing by any server computer system. Identically configured server computer systems provide for an inefficient use of server storage space and processing resources. In addition, maintaining duplicate file systems and data within each server can create configuration management problems such as having to consistently update the data on each server so that all servers are always configured the same.

Conventional content aware load balancing implementations also suffer from deficiencies since an administrator must configure the content aware load-balancing device (e.g., a switch) as well as each of the server computer systems in a consistent manner to ensure that the configuration of the servers is consistent with configuration of the content aware switch. During the configuration process, the administrator must have knowledge of what portions of data will be contained within which servers in order to properly configure the load balancing device to perform correct content aware switching or routing of client requests. Proper configuration ensures this device will properly route the client requests for the appropriate data to the appropriate server. Once configured, a content aware load balancing device operating as a front-end for a group of servers can enable requests from the same client to be directed to a single server thus enabling that server to maintain state information about a client communications session even though the communications protocol used to transport the client requests may be stateless.

However, content aware load balancing implementations still require significant human management and involvement in order to pre-configure data at each server computer system in a coordinated manner with the content aware load balancing device in order to function properly. Further still, as client demands for access to certain data within a group of server computer systems changes over time (e.g., certain data in one server is requested much more frequently than other data from other servers), such conventional content aware load balancing implementations are not able to adapt well to such changing demands. Information system designers have observed that in many client/server information systems, 90 percent of client requests are directed to only 10 percent of the data served by a group of servers. Since information that is most frequently requested by client computer systems can change over a period of time, conventional client/server implementations do not provide an efficient mechanism to dynamically adapt to these demand changes. Such systems rely largely on human intervention to maintain the configuration of the appropriate portions of frequently accessed data stored within multiple server computer systems. Administrators of such conventional systems can use performance management tools that perform such tasks as data access log analysis to identity those portions of data that are most sought after.

Embodiments of the invention significantly overcome these and other deficiencies of conventional data access systems and provide an adaptive load balancing device that operates within a networked computing system environment that includes mechanisms and techniques for receiving and processing client data access transactions for data provided within a plurality of server computer systems coupled to the adaptive load balancer. The adaptive load balancer of this invention thus presents, to the client computer systems, a collective or aggregated set of data systems (e.g., file systems or web services) operating within respective server computer systems as a single virtual data system (e.g., as a single file system or web service) to the client computer systems. The client computer systems need not have any knowledge of the existence of the individual respective server computer systems that operate separate server data systems.

As an example, one or more adaptive load balancers can be configured to operate in conjunction with a plurality of server computer systems to provide access, on behalf of client computer systems, to an aggregated file system referred to herein as a virtual file system. The virtual file system represents an aggregation of a collective set of files available within each server file system maintained by each server computer system. The adaptive load balancer can use a data access protocol such as NFS or CIFS to provide access to and management of respective individual files stored within a collection of server file systems.

Continuing the file system example, the adaptive load balancer of this invention maintains state information referred to as metadata that contains information concerning the locations of particular individual files within particular server file systems of respective server computer systems. In addition, the metadata maintains translation information that the adaptive load balancer uses to map client data access transactions to server data access transactions for access to particular files according to data access operations specified by the client. In other words, the adaptive load balancer configured in accordance with embodiments of the invention maintains the metadata to map client data access requests or transactions such as NFS file access operations (or web services requests in a web services configuration) to corresponding server data access transactions and to perform a reverse translation from server responses back to client responses.

This translation process as will be explained herein can involve mapping virtual file system parameters specified in the client data access transactions into physical file system parameters of a particular server file system for access to a particular file stored by one of the server computer systems. In addition, the translation process can include identifying which particular server computer system maintains a version of the file to be accessed. Once mapped to a server data access transactions, the adaptive load balancer can use a data access protocol, such as, for example NFS or CIFS, to access the file within the appropriate server file system and can receive a server data access responds. Upon receipt of the server response, the adaptive load balancer can translate, using the metadata, the server data access response into a client data access response and can transmit or otherwise forward this client response back to the original requesting client computer system. In this manner, embodiments of the invention of provide access by client computer systems to the virtual file system while insulating the client from details associated with accessing the particular requested file within a particular server computer system.

Also as will be explained herein, embodiments of the invention provide for dynamic replication and migration of files across multiple server file systems. As an example, the adaptive load balancer can detect trends of access to particular information, files or other data or services provided within the virtual file system. Such trends can include, for example, an increase in demand for access to a file or a decrease in such demand. Based on detecting such a trend in file, data or web service access by clients, embodiments of invention are capable of dynamically responding to the trend by, for example, replicating a popular or highly sought after file or group of files or web service data to a number of other server computer systems in order to distribute processing load more evenly within the plurality of server computer systems in order to more efficiently service client data access transactions for access to this particular set of files, data or service.

Embodiments of the invention are not limited to an adaptive load balancer that aggregates server file systems. Embodiments of the invention are also applicable to other types of data processing systems available from server computer systems such as, for example, web services that are available from a group of server computer systems. In such embodiments, the adaptive load balancer can appear to client computer systems as a single server computer system that provides a collective or aggregated set of Web services as a single virtual web service that, in actuality, is operating or is physically provided by a collection of server computer systems each supporting a respective web service. In such a configuration, the adaptive load balancer can receive web service transactions such as XML web services messages transmitted to the adaptive load balancer over the Simple Object Access Protocol (SOAP) and HTTP. The adaptive load balancer maintains metadata that provides a web services mapping from the client data access transactions containing data access operations that include client web services messages to corresponding messages sent to a selected web service server or servers.

Embodiments of the invention include the methods of processing information as explained herein. In addition, other embodiments include an adaptive load balancer that is a computerized device, such as data communications device, network device (e.g., router, switch, gateway, firewall, etc.) or other computerized device configured to process some or all of the method and processing operations disclosed herein as embodiments of the invention. In such embodiments, a computerized adaptive load balancing device includes a memory system, a processing unit (e.g., Central Processing Unit, controller, etc.), a communications interface and an interconnection mechanism connecting these components. The memory system is encoded with an adaptive transaction processing application that when performed on the processing unit, produces an adaptive transaction process that operates as explained herein to perform the method embodiments and operations explained herein as embodiments of the invention.

Other arrangements of embodiments of the invention that are disclosed herein include software programs to perform the method embodiment steps and operations summarized above and disclosed in detail below for the adaptive load balancer and adaptive transaction process. More particularly, a computer program product is disclosed that has a computer-readable medium including computer program logic encoded thereon that when performed in a computerized device provides associated operations of the adaptive transaction process as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc.

The software or firmware or other such embodiments can be installed onto a computerized device to cause one or more processing units in the computerized device to perform the techniques explained herein as embodiments of the invention. Software processes that operate in a collection of computerized devices, such as in a group of adaptive load balancers are also considered an embodiment of the invention. Embodiments of the invention include a plurality (e.g., two or more) adaptive load balancers working in conjunction with each other, or can comprise a single adaptive load balancer operating as explained herein.

It is to be understood that the system of the invention can be embodied strictly as a software program, as software and hardware, or as hardware alone. Example embodiments of the invention include an adaptive load balancer manufactured by Acopia Networks, Inc. of Chelmsford, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
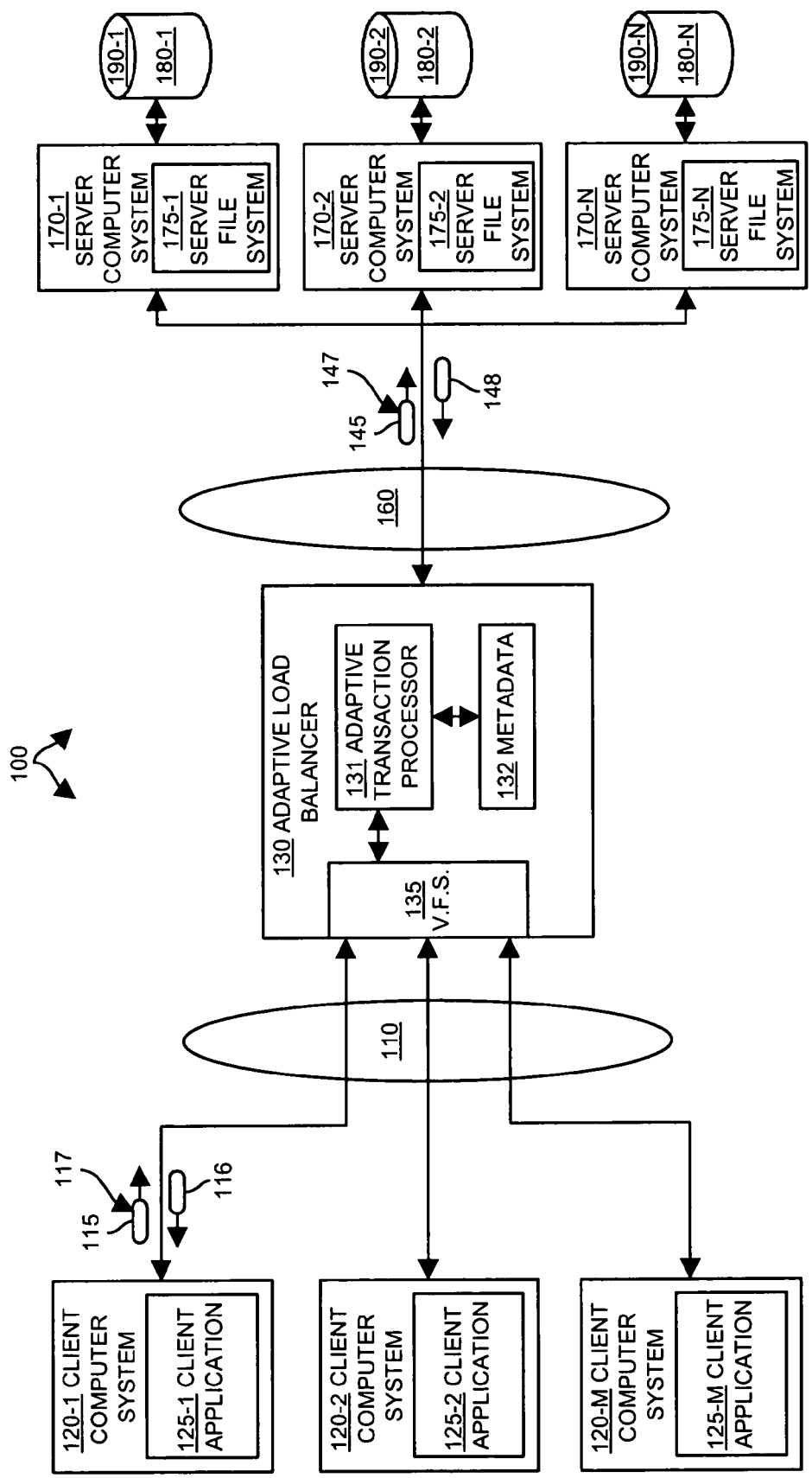
FIG. 1 illustrates an example network and computing system environment including an adaptive load balancer configured to operate according to embodiments of the invention.

Generally, embodiments of the invention provide an adaptive load balancing device that operates within a networked computing system environment to present, to client computer systems, a collective or aggregated set of server data systems operating within respective server computer systems as a single virtual data system available from the adaptive load balancer to the client computer systems. One or more adaptive load balancers configured in accordance with embodiments of the invention can operate collectively as a front-end or access point for files or services provided from a plurality of server computer systems without the clients requiring knowledge of each server file system. Client computer systems submitting client data access transactions (i.e., client requests) to an adaptive load balancer of this invention essentially perceive that the adaptive load balancer(s) is/are one large server computer system for all effective purposes.

In addition, in other embodiments of the invention, multiple adaptive load balancers can operate in conjunction with each other to provide dynamic and adaptive replication and migration processing of data such as files across a plurality of server computer systems to allow the system to automatically adjust to changes in demands or requirements to access certain data, files or services. As an example, using two or more adaptive load balancers that each provide access to the virtual file system for a respective set of server file systems operating in respective groups of server computer systems associated with each adaptive load balancer, if a first adaptive load balancer detects an increase in demand for certain files within its virtual file system, the first adaptive load balancer can replicate (i.e., copy) those files to the virtual file system of the second adaptive load balancer so that client requests can be served by both adaptive load balancers. This allows a data, file or service serving system using adaptive load balancers of this invention to automatically adapt to changing network conditions. The result is the ability to efficiently and automatically respond to changes in demands for access to data, files or services without significant human intervention (e.g., without having to manually replicate and then de-replicate copies of files as access demands increase, and then decrease).

In addition, one or more adaptive load balancers of this invention can provide for different classes of data storage and data virtualization by providing, for example, replication and/or migration of data (e.g., files or web services data) between a plurality of back end data (e.g., file or web services) servers. As an example, when replication is performed as explained herein by a single adaptive load balancer, additional copies of frequently accessed data are made on multiple server file systems of respective back-end file servers. Once this is done, new client requests for data are spread across the multiple server file systems that have the copies, thus distributing the load of access to this replicated data. As another example that will be explained in more detail herein, if some servers have fast file systems while others have lesser performing or slower file systems (or the server computers themselves are slower), the adaptive load balancer can select the higher performing servers to obtain the replicated copies of the file or other data for faster access in serving virtual client requests for this data that are spread across the fast servers containing the replicated copies (as opposed to the slower servers).

FIG. 1 illustrates an example of a computing system environment 100 suitable for use in explaining example operations of embodiments of the invention. The computing system environment 100 includes a communications network 110 such as a local area computer network or wide area computer network (e.g., LAN, WAN or the Internet) that interconnects and supports communications between a plurality of client computer systems 120-1 through 120-M and an adaptive load balancer 130 configured in accordance with embodiments of the invention. A local area network 160 interconnects and supports communications between the adaptive load balancer 130 and a plurality of server computer systems 170-1 through 170-N. Each server computer system 170-1 through 170-N maintains a respective server data system 175-1 through 175-N (e.g., a server file system) that provides access to a respective set of data 180-1 through 180-N (e.g., files) stored within a respective server data storage system 190-1 though 190-N.

The adaptive load balancer 130 operates an adaptive transaction processor 131 that performs processing of the invention as explained herein to provide or present a virtual data system 135 (e.g., a virtual file system or virtual web service system) accessible to client applications 125 that execute on the client computer systems 120. The client computer systems 120 may be any type of computerized device that requires access to files, data, services or other information provide by the adaptive load balancer 120 within the virtual data system 135 as explained herein via the use of one or more appropriate data access protocols.

As an example, the virtual data system 135 may be a virtual file system and the client computer systems 120 may be personal computers, workstations or the like that operate client applications 125 that require access to files within the virtual file system. An operating system (not specifically enumerated in FIG. 1) executing within a client computer system 120 can use a network file access protocol such as NFS or CIFS to transmit client data (i.e., file) access transactions 115 containing data access operations 117 over the network 110 to the adaptive load balancer 130 for access to files exported within the virtual file system 135 according to those operations 117.

To provide the aggregation of the server file systems 175 into a single virtual file system 135, the adaptive transaction processor 131 maintains metadata 132 that includes information for mapping or translating the client data access transactions 115 and associated data access operations 117, such as NFS file access requests, into server data access transactions 145. The metadata 132, as will be explained in more detail, contains virtual data system to server data system parameter mapping information. As an example, in embodiments that provide a virtual file system 135, the metadata 132 provides a mapping of virtual file (and directory) handle parameters, specified within an NFS or CIFS file access operation 117 (contained within a client file access transaction 115) received from a client computer system 120, to corresponding server file system file (or directory) handle parameters of a file or directory within a particular server file system 175. The metadata 132 further allows identification or selection of a particular server computer system 170 to which the adaptive transaction processor 131 forwards a resulting mapped server access operation 147 within a server file access transaction 145.

Within the adaptive load balancer 130, the adaptive transaction processor 131 operates one or more appropriate data (i.e., file) access protocols such as NFS and/or CIFS to communicate with each of the server computer systems 170 to access to the respective server data systems 175 (i.e., server file systems in this example embodiment). Likewise, the adaptive transaction processor 131 can receive a server transaction response 148 (e.g., an NFS response) from the server computer system 170 (to which the server data access transaction was forwarded) and can use the metadata 132 to convert, map or otherwise translate this response 148 back into a client data access response 118 that the adaptive load balancer 130 returns to the original requesting client computer system 120. In this manner, in one embodiment the adaptive transaction processor 131 operates to present a collective set of server file systems 175-1 through 175-N that each have a respective set of files 180-1 through 180-N available as an aggregated set of files without identifying to the client computer systems 120 that the files are stored on different server computer systems 170. The adaptive load balancer 130 uses the metadata 132 associated with the virtual file system to manage access to the aggregated sets of files within the server computer systems on behalf of client computer systems requesting access to files via the virtual file system 135. Further operation of an adaptive load balancer 130 in accordance with embodiments of the invention will be explained below in a series of flow charts.

Figure 2:
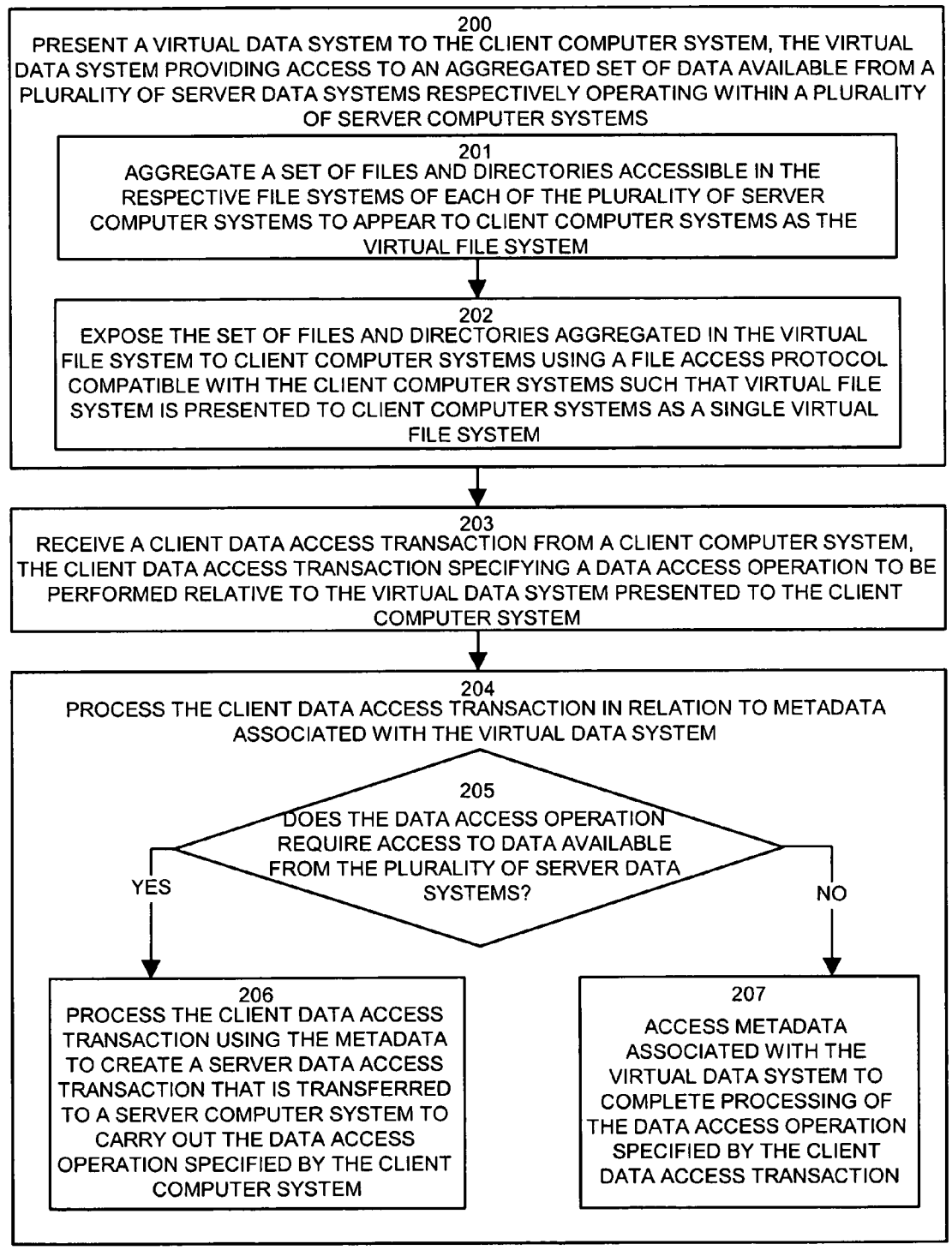
FIG. 2 is a flow chart of processing steps that show the general operation of an adaptive transaction process operating in an adaptive load balancer configured to process client data access requests according to embodiments of the invention.

FIG. 2 is a flow chart of processing steps that the adaptive load balancer 130 performs to process client data access transactions in accordance with one embodiment of the invention. The processing steps in FIG. 2 show the general processing of the adaptive transaction processor 131 operating in a single load balancer 130. Operation of multiple adaptive load balancers 130 operating in conjunction with each other to perform such functions as data, service and file replication and migration between different groups of servers will be presented later after the general operation of transaction processing is explained in relation to the single load balancer 130 illustrated in FIG. 1.

In step 200, the adaptive load balancer 130 of this embodiment of the invention presents a virtual data system 135 to one or more client computer systems 120. The virtual data system 135 provides access to an aggregated set of data, files or services available from a plurality of server data systems 175 respectively operating within a plurality of server computer systems 170. As noted in the above example, in one embodiment the virtual data system 135 may be, for example, a virtual file system and the server data systems are server file systems respectively associated with each of the plurality of server computer systems 170. A file system example is used herein to explain the general operation of the adaptive load balancer 130. In an alternative configuration that will be explained in more detail later, the virtual data system 135 may provide an aggregation of other types of server data systems 175, such as web services.

To provide a virtual file system 135, in sub-step 201, the adaptive load balancer 130 aggregates a set of files 180-1 through 180-N and directories accessible in the respective server file systems 175 of each of the plurality of server computer systems 170 to appear to client computer systems 120 as the virtual file system 135.

In step 202, the adaptive load balancer exposes the collective set of files and directories 180-1 through 180-N aggregated in the virtual file system 135 to client computer systems 120 using a file access protocol compatible with the client computer systems 120 such that virtual file system 135 is presented to client computer systems as a single virtual file system within that protocol. This provides a single point of access to the files and directories of the aggregated set of files and directories of each of the plurality of server computer systems 170. The file access protocol may be, for example, the Network File System (NFS) protocol or the Common Internet File System (CIFS) protocol.

In step 203, the adaptive load balancer receives a client data access transaction 115 from a client computer system 120. The client data access transaction 115 specifies a data access operation 117 to be performed relative to the virtual data system 135 presented to the client computer system 120 by the adaptive load balancer 130. In the file system example, the client data access transaction 117 is a file system request for access to information associated with a file presented to the client computer system 120 within the virtual file system 135. The adaptive load balancer 130 operates in conjunction with the server file systems 175 of each of the server computer systems 170 according to the NFS protocol and/or the CIFS protocol as well over the network 160.

In step 204, the adaptive load balancer processes the client data access transaction 115 in relation to metadata 132 associated with the virtual data system 135. In one embodiment, the metadata 132 is information maintained by the adaptive load balancer 130 to map or translate virtual file parameters within file system requests 117 provided from client computer systems 120 for access to a file presented within the virtual file system 135 to corresponding physical file parameters of an instance of a file (e.g., within a set of files 180) in at least one of the server file systems 175 maintained by at least one of the server computer systems 170. Details of this mapping and translation operation will be presented shortly in subsequent flow charts.

In step 205, the adaptive load balancer determines if the data access operation 117 (specified in the client transaction 115) requires access (or not) to data available from the plurality of server data systems 170. In certain instances, depending upon the specific data access operation 117 specified by the client 120, the adaptive transaction processor 131 may or may not be required to perform direct access to a server computer system 170. As an example, the adaptive transaction process 131 can process certain NFS operations using only the metadata 132 without requiring creation and transmission of a corresponding server data access transaction 145 to any server 170. A specific example is the NFS READDIR operation. This is because such NFS operations do not require or involve access to or manipulation of actual file data contained within specific files 180. Rather, such operations involve access to data about those files, such as the name of a file or the location of a file (e.g. directory or path), or the existence of a directory.

As such, embodiments of the invention are based in part on the observation that certain data access operations can be satisfied (i.e., performed with a response 116 transmitted back to the client 120) without requiring direct access to a particular file in a particular server 170. Other types of data access operations 117, such as, for example, NFS READ, WRITE, GETATTR, and SETATTR require direct access to data within files or data within a server file system 175. In such cases, the adaptive transaction process 131 operates as will be explained to translate the client data access transaction 115 into a corresponding server data access transaction 145 for forwarding to a specific server computer system 170. Further details on this will be explained shortly.

In step 205, if the data access operation 117 (specified in the client transaction 115) requires access to data available from the plurality of server data systems 170, processing proceeds to step 206.

In step 206, the adaptive load balancer processes the client data access transaction 115 using the metadata 132 to create a server data access transaction 145 that is transferred to a server computer system 170 to carry out the data access operation 117 specified by the client computer system 120. Further details of the processing performed in step 206 will be explained shortly in FIG. 3.

Returning attention to step 205, if the data access operation 117 (specified in the client transaction 115) does not require access to data available from the plurality of server data systems 170, processing proceeds to step 207.

In step 207, the adaptive load balancer accesses metadata 132 associated with the virtual data system to complete processing of the data access operation specified by the client data access transaction. This can involve, for example, accessing directory or file mapping information to satisfy NFS operations such as NFS LOOKUP, READDIR, STATFS or other operations not requiring specific access to the files in server file systems 175.

Figure 3:
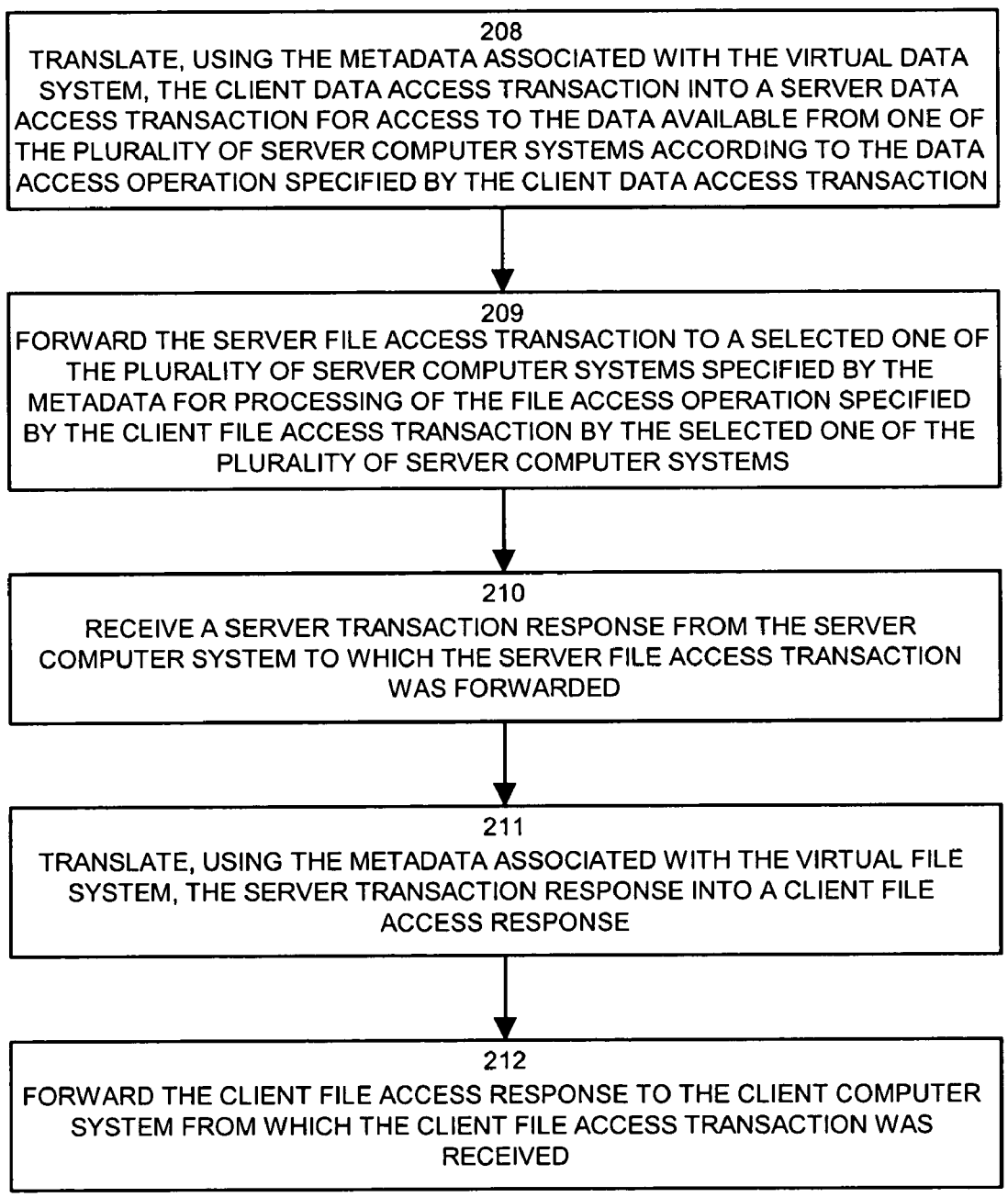
FIG. 3 is a flow chart of processing steps that show operation of translation of a client transaction into a server transaction and submission to a server computer system from an adaptive load balancer configured according to embodiments of the invention.

FIG. 3 is a flow chart of processing steps performed in one embodiment of the invention to process the client data access transaction 115 using the metadata 132 to create a server data access transaction 145 that is transferred to a server computer system 170 to carry out the data access operation 117 specified by the client computer system 120. In other words, the steps in FIG. 3 are sub-steps performed in step 206 of FIG. 2.

In step 208, for operations that do require access to a server 170, the adaptive load balancer 130 translates, using the metadata 132 associated with the virtual data system 135, the client data access transaction 115 into a corresponding server data access transaction 145 for access to the data 180 available from one of the plurality of server computer systems 170 according to the data access operation 117 specified within the client data access transaction 115. Generally, translation involves mapping web service, data or file parameter information specified in the data access operation 117, such as file handles and/or other file parameters or web service parameters, into corresponding server parameters and further includes identification of a specific server 170 to process the resulting server transaction 145 (produced form the translation). Further details of this translation with respect to a file system will be explained shortly.

Once translated, in step 209, the adaptive load balancer 130 forwards the server file access transaction 145 to a selected one of the plurality of server computer systems 170 specified by (i.e., selected using) the metadata 132 for processing of the file access operation 117 specified by the client file access transaction 115 by that selected server computer system 170. Once the server computer system 170 processes the requested server transaction 145, it produces a server transaction response 148 that the server 170 transmits back to the adaptive load balancer 130.

In step 210, the adaptive load balancer 130 receives a server transaction response 148 from the server computer system 170 to which the server file access transaction 145 was forwarded (in step 207).

In step 211, the adaptive translation processor 131 operating in the adaptive load balancer 130 translates, using the metadata 132 associated with the virtual file system 135, the server transaction response 148 into a client file access response 116. Generally, this reverse translation involves mapping resulting web service, data or file parameter information specified in the server transaction response 148, such as file handles and/or other file or service parameters specific to the responding server computer system 170, into corresponding virtual data system parameters (useable by the clients 120) and further includes identification of the specific client 120 to process the resulting client data access response 116 (produced from the reverse translation).

In step 212, the adaptive load balancer 130 forwards the client data (i.e., file in the file system example) access response 116 to the client computer system 120 from which the client file access transaction 115 was received. In this manner, the virtual file system 135 provides the access to the file requested by the client while insulating the client from details of which particular server contains the file.

The aforementioned processing steps provide an overview of the general operation of an adaptive load balancer 130 configured according to embodiments of the invention. The flow charts that follow provide details of the aforementioned processing steps.

Figure 4:
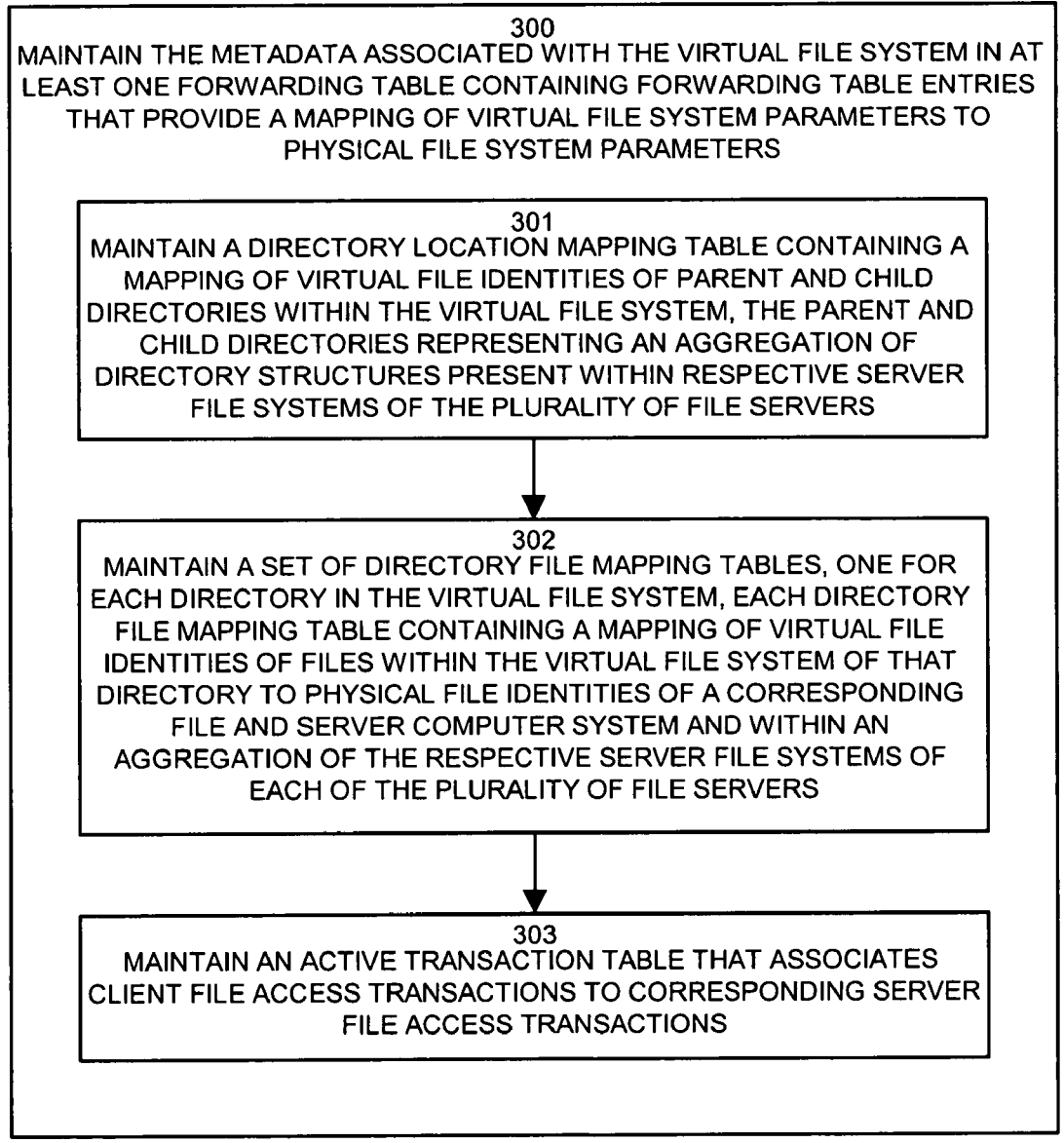
FIG. 4 is a flow chart of processing steps that shows maintaining metadata forwarding tables in an adaptive load balancer configured according to embodiments of the invention.

FIG. 4 is a flow chart of processing steps that the adaptive load balancer 130 performs in accordance with embodiments of the invention to maintain the metadata 132 used in performing the translation and mapping process of virtual data system parameters associated with client data access transactions 115 into corresponding parameters useable within the server data systems 175.

In step 300, the adaptive load balancer 130 maintains the metadata 132 associated with the virtual file system 135 in at least one forwarding table (see example below) containing forwarding table entries (rows) that provide a mapping of virtual file system parameters to physical file system parameters. The mapping can including, for example, a mapping of virtual file identifiers (e.g., virtual file system file handles) corresponding to each available file accessible by client computer systems 120 in the virtual file system 135 to both a corresponding (one or more) physical file identifier (i.e., server file system file handle(s)) and an identity of at least one server computer system of the plurality of server computer systems at which an instance of that file can be accessed using that corresponding physical file identifier. Forwarding tables can include directory location mapping tables, directory file mapping tables, and active transaction tables as explained below.

In step 301, the adaptive load balancer 130 maintains a directory location mapping table (example below) containing a mapping of virtual file identities of parent and child directories within the virtual file system 135. The parent and child directories represent an aggregation of directory structures (i.e., parent and child sub-directories) present within respective server file systems 175 of the plurality of file servers 170.

An example of a directory location mapping table containing a mapping of virtual file system directories to physical (i.e., server) file system directories stored in one or more server file systems 175 is shown in the table below:

| Source or Parent Virtual File Handles (SFH) | Lookup File Handles (LFH) (lookup value or component) | Child Virtual File Handles (VFH) |
|---|---|---|
| /home | . | /home |
| /home | ./usr | /home/usr |
| /home/usr/ | ./Joe | /home/usr/Joe |
| /home/usr | ./Sally | /home/usr/Sally |
| /home/usr/Joe | JoeFile1.doc | 12345 |
| /home/usr/Joe | JoeFile2.doc | 34567 |
| /home/usr/Sally | SallyFile-Y.txt | 56789 |
| ... | ... | ... |

Example Directory Location Mapping Table

In the above example directory location mapping table, left-hand column labeled Parent Virtual File Handle (SFH) contains example file handles (expressed here as directory names) of directories that the adaptive load balancer 130 presents to the client computer systems 120 via a data access protocol such as NFS or CIFS (e.g., via exporting the "/home" directory as a mount point). The middle column contains Lookup File Handles (LFH) that specify a target directory for which a file handle is to be obtained. The file handles in the LFH column thus contain the target names of files and/or sub-directories within the parent or source directory specified by the SFH (Column 1). The corresponding (i.e., resulting) file handles of each LFH are provided in the right-hand column labeled Child Virtual File Handles (VFH).

The above example Directory Location Mapping Table corresponds to an NFS or CIFS file system directory tree structure presented by the virtual file system 135 that appears generally as follows:

/home
  /usr
    /Joe

-continued

JoeFile1.doc
      JoeFile2.doc
    /Sally
      SallyFile1.txt
      ...
    ...
  ...

Example Virtual File System Directory Structure

Note that indentation towards the right in the above example indicates child files or sub-directories contained within upper-level or parent directories that are contained above and to the left. Thus /usr is a child or sub-directory of /home and contains two sub-directories itself, /Joe (i.e., for a user named Joe) and /Sally (i.e., for a user named Sally). Joe's /home/usr/Joe sub-directory contains two physical files, JoeFile1.doc and JoeFile2.doc, while Sally's sub-directory /home/usr/Sally contains one example file SallyFile.txt. Note that the "..." indicates that other files or directories could be contained within the directories and that this is a simple example only.

As will be explained, the adaptive transaction process 131 can create a directory location mapping table for a number of different directory structures exported as mount points within the server file systems 175 from each serve computer system 170. Creation of this table can be done via a traversal, using NFS or CIFS commands (depending upon what protocol a particular server supports), of the entire set of server file systems 175-1 through 175-N upon adaptive load balancer installation. In other words, the metadata tables can be populated, from scratch, given the identity of a set of servers containing file systems that are to be aggregated by the adaptive load balancer as explained herein. Once the server and file system identities are known, the system of the invention can populate the metadata for each file system by traversing the entire directory structure of the file system to identify each file and directory path thus creating the aforementioned metadata table information. Once created, the adaptive transaction process 131 can receive client data access transactions 115 containing, for example, NFS or CIFS data access operations 117 such as NFS LOOKUP commands and can use the directory location mapping table within the metadata 132 to resolve a particular requested a virtual file handle into the appropriate virtual file handle of the file or directory that the client 120 seeking access to within the virtual file system 135.

As an example, a client seeking access (e.g., via a sequence of NFS lookup commands) to a file having the full directory path /home/usr/joe/JoeFile1.doc can provide a sequence of one or more NFS LOOKUP operations 117 in the adaptive transaction process 131 and can use the above example directory location mapping table to identify the virtual file handle (VFH) "12345" associated with that file in the virtual file system 135. Note that the example file handles "12345" and so forth represented here as examples only and do not represent actual file handles used by NFS of CIFS.

Returning attention to the flowchart of processing steps in FIG. 4, in step 302, the adaptive load balancer further maintains, as metadata 132, a set of directory file mapping tables, one for each directory in the virtual file system, and each directory file mapping table contains a mapping of virtual file identities (i.e., virtual file handles) of files within the virtual file system 135 of (i.e., in) that directory to physical file identities (i.e., physical server file handles) of a corresponding file 180 within a server file system 175 operating on a respective server computer system 170.

An example of a directory file mapping table containing a mapping of virtual file system parameters (e.g., virtual file handles) to physical (i.e., server) file system parameters (e.g., server file handles) for files stored in one or more server file system directories is shown in the table below:

| Virtual file handles (VFH) | Physical file handles (PFH) | Server Computer System identity | Other parameter mappings |
| --- | --- | --- | --- |
| 12345 | ABCDE | 170-1 | ... |
| 34567 | CDEFG | 170-1 | ... |
| 34567 | PQRST | 170-2 | ... |
| 56789 | EFGHI | 170-N | ... |
| ... | ... | ... | ... |

Example Directory File Mapping Table

The example directory file mapping table above maps virtual file handles of files or directors within the virtual file system 135 to physical or server file handles of actual files stored within server computer systems. In addition, example directory file mapping table includes the identity of one or more server computer systems 170 that contain an instance or copy of that file corresponding to the virtual file handle in column 1. Note that in this example, the file JoeFile2.doc is known to client applications 125 by using the virtual file handle 34567 and maps to two replicated server instances or copies of that file. The first copy has a physical file handle "CDEFG" and resides within the server file system 175-1 within the server computer system 170-1 in FIG. 1 whereas the second copy has a physical file handle "PQRST" and resides within the server file system 175-1 operating within the server computer system 170-2.

Using a directory file mapping table, upon receipt of a client file access transaction 115 specifying a file access operations 117 such as a NFS READ or WRITE operations to a specific file identified by a virtual file handle (e.g., READ from file 12345), the adaptive transaction process 131 can use the directory file mapping table to identify an appropriate physical or server file handle (PFH, Column 2 in example above) of a corresponding file within a server file system 175 on a particular server 170 in order to carry out the requested data access operation 117. In one embodiment, there can be multiple directory file mapping tables, such as a separate directory file mapping table for each directory listed in the directory location mapping table. Multiple directory file mapping tables can speed up access to the required mapping information as opposed to searching a single very large table for file handles of interest.

Returning attention again to the flowchart of processing steps in FIG. 4, in step 303, the adaptive load balancer 130 also maintains, in this embodiment, an active transaction table that associates client file access transactions 115 to corresponding server file access transactions 145. An example active transaction table is shown below:

| Client/ Virtual Transaction Identification | Client Identity | Virtual Data/File Parameters | Server/ Physical Transaction Identification | Server Data/File Parameters | Server Identity |
| --- | --- | --- | --- | --- | --- |
| CT-1 | 125-1 | 12345 ... | ST-1 | ABCDE ... | 170-1 |
| CT-2 | 125-2 | 34567 ... | ST-2 | PQRST ... | 170-2 |
| CT-3 | 125-3 | 56789 ... | ST-3 | EFGHI ... | 170-N |
| ... | ... | ... | ... | ... | ... |

Example Active Transaction Table

According to the operation of data access protocols such as NFS and CIFS, each data access operation 117 submitted and being serviced by the adaptive transaction processor 131 has an associated transaction identification. Accordingly, each client data access transaction 115 has as associated client transaction identification CT-Y, where Y in the table above represents a variable or number identifier for a currently active NFS transaction. By currently active, what is meant is an NFS data access operation 117 that is being serviced by the adaptive load balancer 130 and that is not yet complete. The adaptive transaction processor 131 maintains information within the active transaction table along with an identity of the client that submitted the transaction 115 to the adaptive load balancer 130. One purpose of the active transaction table is to quickly provide a return mapping of server transaction responses 148 for forwarding to the appropriate client computer system that originated a client transaction 115.

In particular, once the adaptive transaction processor 131 converts the client file data access transaction 115 into a corresponding server data access transaction 145, the server data access transaction 145 will likewise have a separate but corresponding server transaction identification. By maintaining a table that corresponds or maps client transaction identifications to server transaction identifications, server transaction responses 148 can be quickly mapped back to respective client transaction identifications of client data access transactions 115 that caused creation of the server transaction response 148. Accordingly, the active transaction table can contain information linking or associating client and corresponding server transactions and can enable the adaptive transaction process or 131 to quickly translate, map, correlate or otherwise substitute appropriate virtual file system parameters, such as sever file handles that a server computer system 170 uses within a server transaction response 148 with corresponding client file handle and parameter information (e.g., NFS flags and other attributes) for efficient conversion and forwarding of server transaction responses 148 as client transaction responses 116 to the appropriate client computer system 120.

The metadata 132 in this example thus includes one or more directory location mapping tables, one or more directory file mapping tables and one or more active transaction tables, collectively referred to herein as forwarding tables. As will be explained in detail, the adaptive load balancer uses the metadata 132 as a basis for supporting operation of the virtual file system 135.

Figure 5:
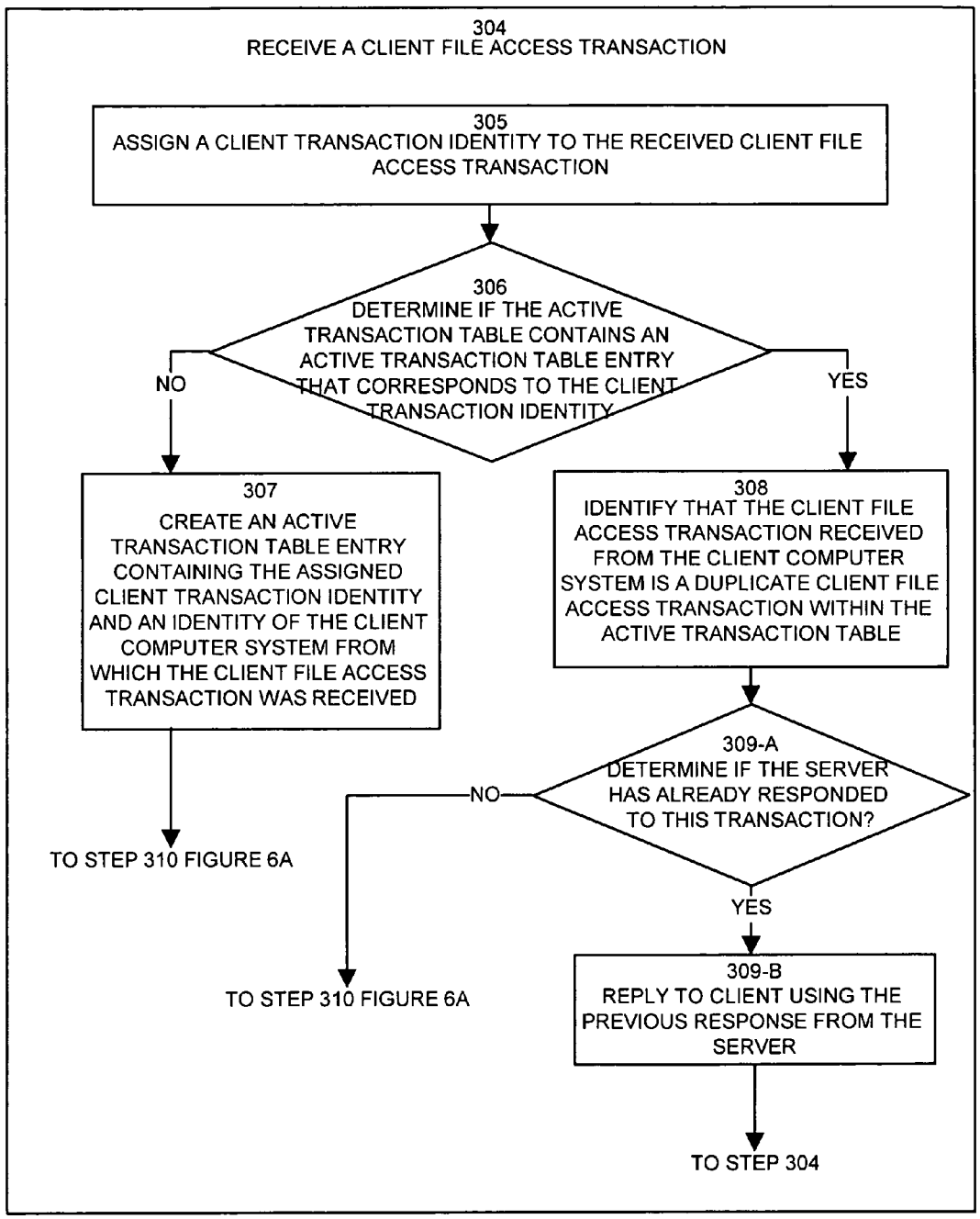
FIG. 5 is a flow chart of processing steps for receiving a client data access transaction in an adaptive load balancer configured according to embodiments of the invention.

FIG. 5 is a flow chart of processing steps that the adaptive load balancer 130 performs in accordance with embodiments of the invention to receive a client file access transaction 115 containing a file access operation 117.

In step 304, the adaptive load balancer receives the client file access transaction 115. As an example, suppose client application 125-2 operating client computer system 120-2 transmits a client file access transaction 115 that specifies a data access operation 117 such as in NFS READ command and to read from the file /home/usr/joe/JoeFile2.doc. This command would appear as "NFS READ 34567", by way of example only. Note that according to standard operation of the NFS protocol, to obtain the virtual file handle 34567 of the file JoeFile2.doc, the client computer system 120-2 would have to had transmitted a series of NFS LOOKUP operations on subsequent portions of the directory path /home/usr/Joe/ Joefile2.doc (i.e., performed NFS LOOKUP operations first on /home, then on /usr, then on /Joe, and then finally on JoeFile2.doc) and the adaptive transaction processor 131 would use the metadata 132 explained above to return corresponding file handles in response to each NFS lookup operation. Thus the example of NFS READ 34567 assumes this process has already taken place (and would have been performed as explained below for metadata-only data access operations 117).

In step 305, the adaptive load balancer assigns a client transaction identity to the received client file access transaction 115, such as CT-2 in the example active transaction table shown above. Client transaction identities are sequentially assigned so that subsequently received client transactions 115 are each assigned different transaction identities.

In sub-step 306, the adaptive load balancer 130 determines if the active transaction table contains an active transaction table entry that corresponds to the client transaction identity CT-2. This check is made in step 306 to determine if the client transaction 115 is a repeat or redundant transaction, in which case processing can proceed to step 308. Alternatively, if the client transaction identity CT-2 assigned to the client file access transaction 115 does not exist in the active transaction table, then this is a new client transaction 115 and processing proceeds to step 307.

In step 307, if the active transaction table does not contain an active transaction table entry (i.e., row) that corresponds to (i.e., that contains) the client transaction identity CT-2, the adaptive load balancer 130 creates an active transaction table entry (i.e., adds a new row or record to the table) containing the assigned client transaction identity CT-2 along with an identity of the client computer system 120-2 (in column 2 of the above example active transaction table) from which the client file access transaction 115 was received. Also in this step, the transaction table entry can be populated (by the adaptive transaction process 131) with client specific information such as NFS attributes, flags, a client file handle, and so forth to speed up reverse translation of server responses explained later. The adaptive transaction process 131 can store this information in the virtual file parameters column (shown in the example table above) for later use.

In step 308, for duplicate transactions 115, the adaptive load balancer 130 identifies that the client file access transaction 115 received from the client computer system is a duplicate client file access transaction within the active transaction table. A duplicate may be received, for example, if a client data access response 116 is not received by a client computer system within NFS timeout period.

In step 309-A, the adaptive load balancer 130, in response to identifying that the client file access transaction 115 is a duplicate, determines whether a response has already been received from the server for this client file access transaction. If so, in step 309-B the adaptive load balancer 130 returns the response previously received from the server as the client data access response 116 and then proceeds to step 304 to receive another client data or file access transaction 115 (from the same or a different client computer system). If in step 309-A, adaptive load balancer 130 determines the server has not yet responded to this transaction then it proceeds to step 310 which will result in a new request to the server.

After processing of step 307 is complete, the adaptive transaction processor 131 has successfully received a client data access transaction 115 and processing can proceed to the flow chart of processing steps shown in FIG. 6 to translate this transaction 115 into a corresponding server data access transaction 145.

Figure 6A:
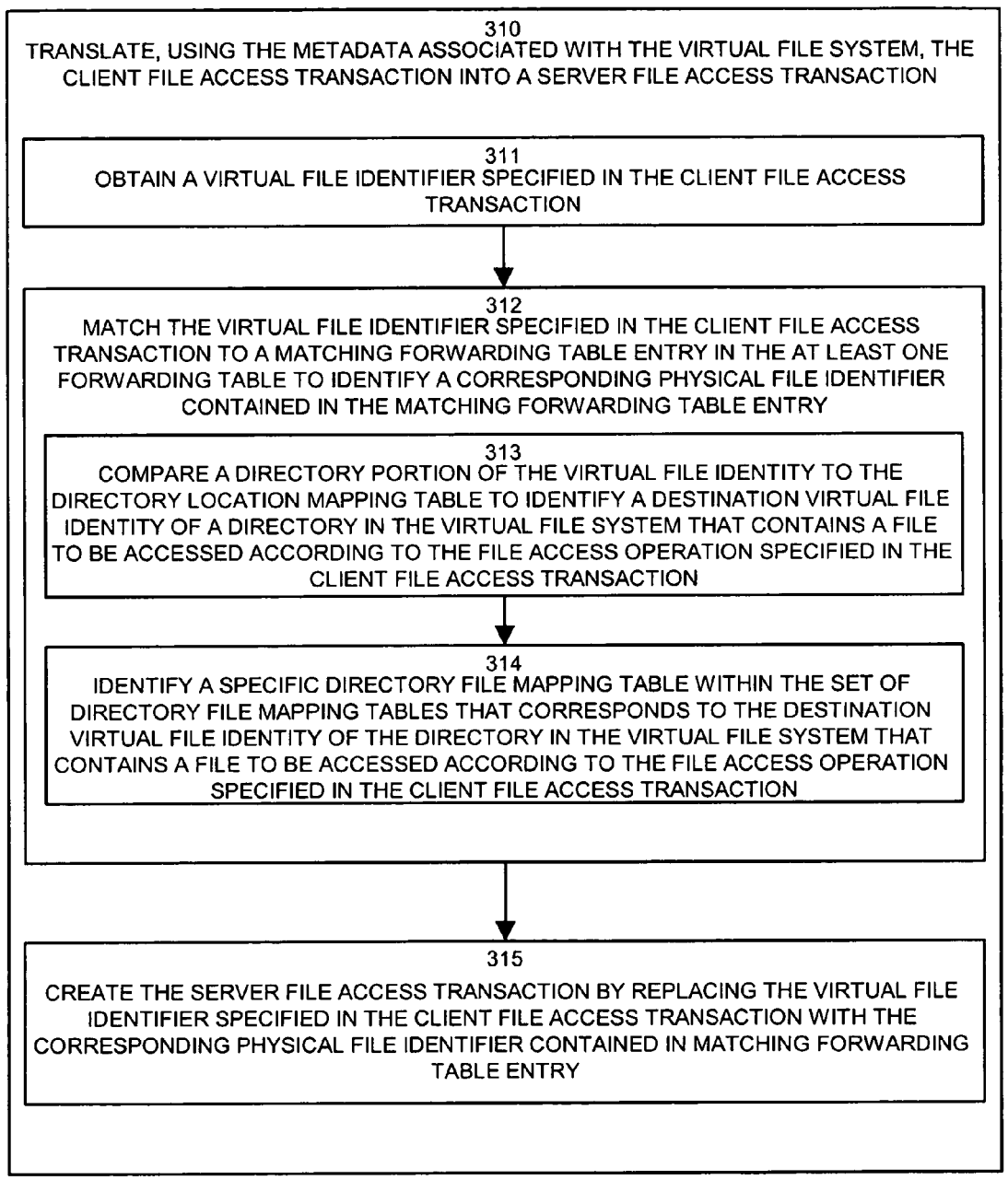
FIGS. 6A and 6B are a flow chart of processing steps for translating client data access transactions in an adaptive load balancer configured according to embodiments of the invention.
Figure 6B:
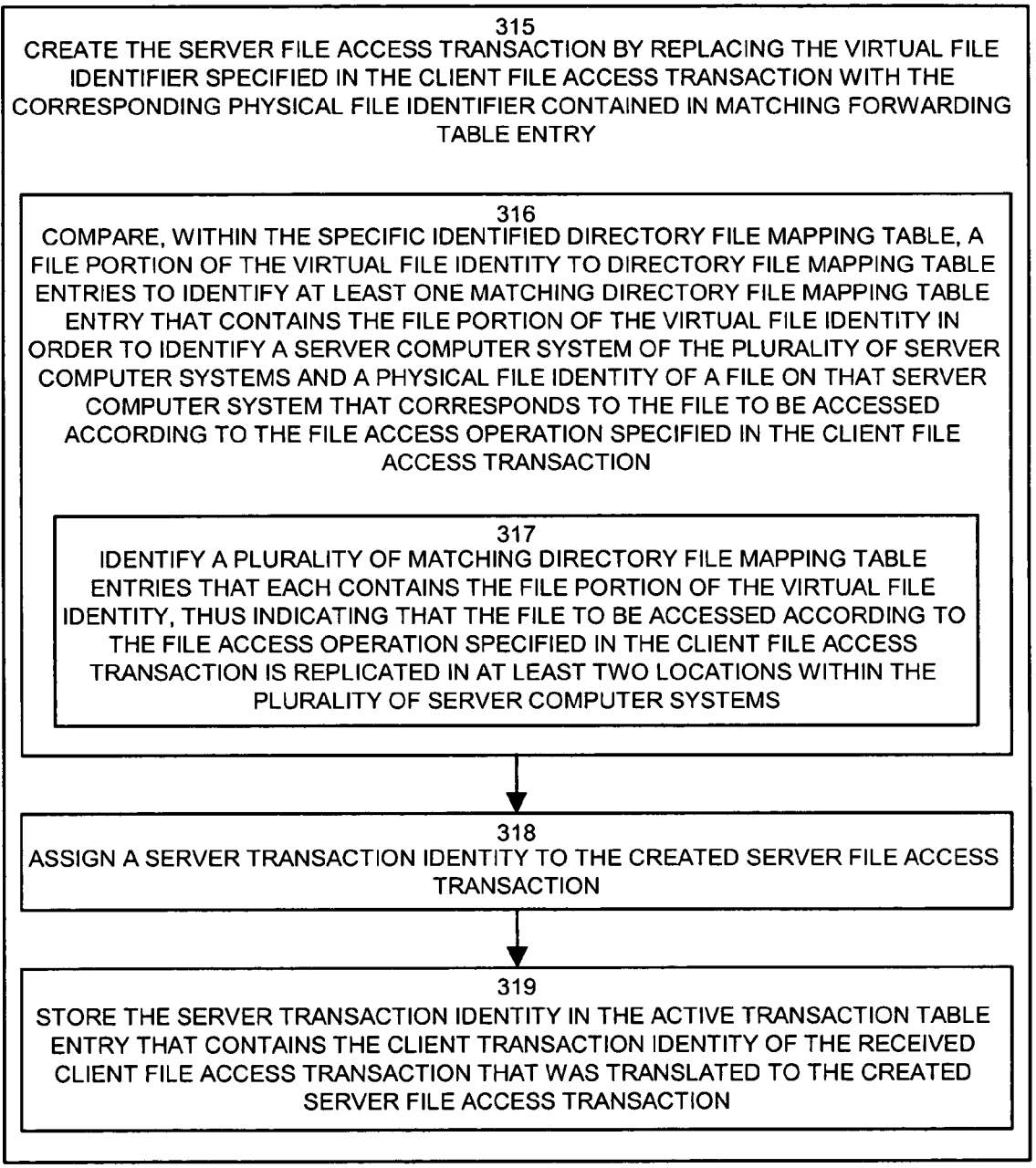

FIGS. 6A and 6B are a flow chart of processing steps that the adaptive load balancer 130 performs in accordance with embodiments of the invention to translate the client data access transaction 115 into a corresponding server data access transaction 145.

In step 310, the adaptive load balancer 130 translates, using the metadata 132 associated with the virtual file system 135, the client file access transaction 115 into a server file access transaction 145. Sub-steps 311 through 319 explain details of this processing.

In step 311, the adaptive load balancer 130 obtains a virtual file identifier specified in the client file access transaction 115. Using the example above of the data access operation "NFS READ 34567," the virtual file identifier is "34567".

In step 312, the adaptive load balancer 130 matches the virtual file identifier (e.g., 34567) specified in the client file access transaction 115 to a matching forwarding table entry in a forwarding table (e.g., the directory file mapping table that maps virtual file handles to physical or server file handles) to identify a corresponding physical file identifier contained in the matching forwarding table entry. Note that when matching a directory, the directory location mapping table is used. The NFS protocol can indicate whether or not the file handles are associated with the directory or a file.

In sub-step 313, in the case of a virtual file identifier corresponding to a subdirectory, the adaptive load balancer 130 compares a directory portion of the virtual file identity (e.g., /home or /usr or /Joe) to the directory location mapping table to identify a destination virtual file identity of a sub-directory in the virtual file system 135 that contains a file (e.g., JoeFile2.doc) to be accessed according to the file access operation specified in the client file access transaction 115.

In sub-step 314, in situations when the virtual file identifier specified within a data access operations 117 is a file handle of the file, the adaptive load balancer 130 identifies a specific directory file mapping table within a set of directory file mapping tables that corresponds to the destination virtual file identity of the directory in the virtual file system that contains a file to be accessed according to the file access operation 117 (e.g., NFS READ 34567) specified in the client file access transaction 115. In other words, since there may be multiple directory file mapping tables, one for each subdirectory within the virtual file system 135, and processing in sub-step 314 identifies the proper directory file mapping table that maps virtual file handles (e.g., the 34567 file handle for the JoeFile2.doc file) to physical file handles (e.g., CDEFG or PQRST in the above example table) for all files in the directory containing the file for which access is requested (i.e., Joefile2.doc), known to the client via the series of NFS lookup operations. At this point in processing, the adaptive transaction processor 131 has thus identified a directory file mapping table containing one or more mappings for entries for the virtual file handle (e.g., 34567) specified within the file access operation 117 received in the client transaction 115.

In step 315, the adaptive load balancer 130 creates the server file access transaction 145 by replacing the virtual file identifier (34567) specified in the client file access transaction 115 with the corresponding physical file identifier (e.g., one of CDEFG or PQRST) contained in the matching forwarding table entry of the directory file mapping table.

FIG. 6B shows the processing details in sub-steps 316 and 317 that explain the processing of step 315 for the flow chart in FIG. 6A in a more detail.

In particular, in FIG. 6B, selection of a server computer system is performed in sub-step 316 in which the adaptive load balancer 130 compares, within the specific identified directory file mapping table, a file portion (i.e., file handle) of the virtual file identity to directory file mapping table entries (i.e., rows) to identify at least one matching directory file mapping table entry that contains the file portion of the virtual file identity in order to identify a server computer system 170 of the plurality of server computer systems 170-1 through 170-N that can be used to access that file, as well as to identify a physical file identity (i.e., server file handle) of a file on that identified server computer system 170 that corresponds to the file to be accessed according to the file access operation specified in the client file access transaction 115.

Note in the example directory file mapping table shown above, there are two matching entries that each contain the virtual file handle 34567. This indicates that multiple server computer systems 170-1 and 170-2 each contain a copy of the data, information or file referenced by this virtual file handle. In particular, server computer system 170-1 contains a copy of this file referenced using the physical file handle CDEFG, while server computer system 170-2 also contains a copy of this file referenced via the server or physical file handle PQRST. In such cases, the file is said to be "replicated" between multiple server computer systems 170.

To handle replication, in step 317, the adaptive load balancer 130 identifies a plurality of matching directory file mapping table entries that each contain the file portion of the virtual file identity, thus indicating that the file to be accessed according to the file access operation specified in the client file access transaction is replicated in at least two locations within the plurality of server computer systems.

In step 317, the adaptive transaction processor 131 can use various criteria to select which particular copy of the file will be chosen for application of the client's requested data access operation 117 with more than one directory file mapping table entry matches the virtual file handle. Factors that can be used in making a selection between which physical file handle to use (and thus which choice of server computer system to select) can include such things as performance metrics associated with each server computer system containing a copy of the file, network congestion that might be experienced when communicating with each server computer system 170 containing a copy of file, and other considerations. Assume for the example command NFS READ 34567 that the adaptive transaction processor 131 selects the matching entry in the directory file mapping table corresponding to the file handle PQRST (i.e., the second matching entry) for the server computer system 170-2. The newly create server data access transaction 145 thus appears as "NFS READ PQRST."

In step 318, the adaptive load balancer 130 assigns a server transaction identity ST-2 to the newly created server file access transaction 145.

In step 319, the adaptive load balancer 130 stores the server transaction identity ST-2 in the active transaction table entry that contains the client transaction identity CT-2 of the received client file access transaction 115 that was translated to the created server file access transaction 145.

In this manner, the adaptive load balancer 130 creates a server data access transaction 145 and establishes the appropriate transaction mapping within the active transaction table.

Figure 7:
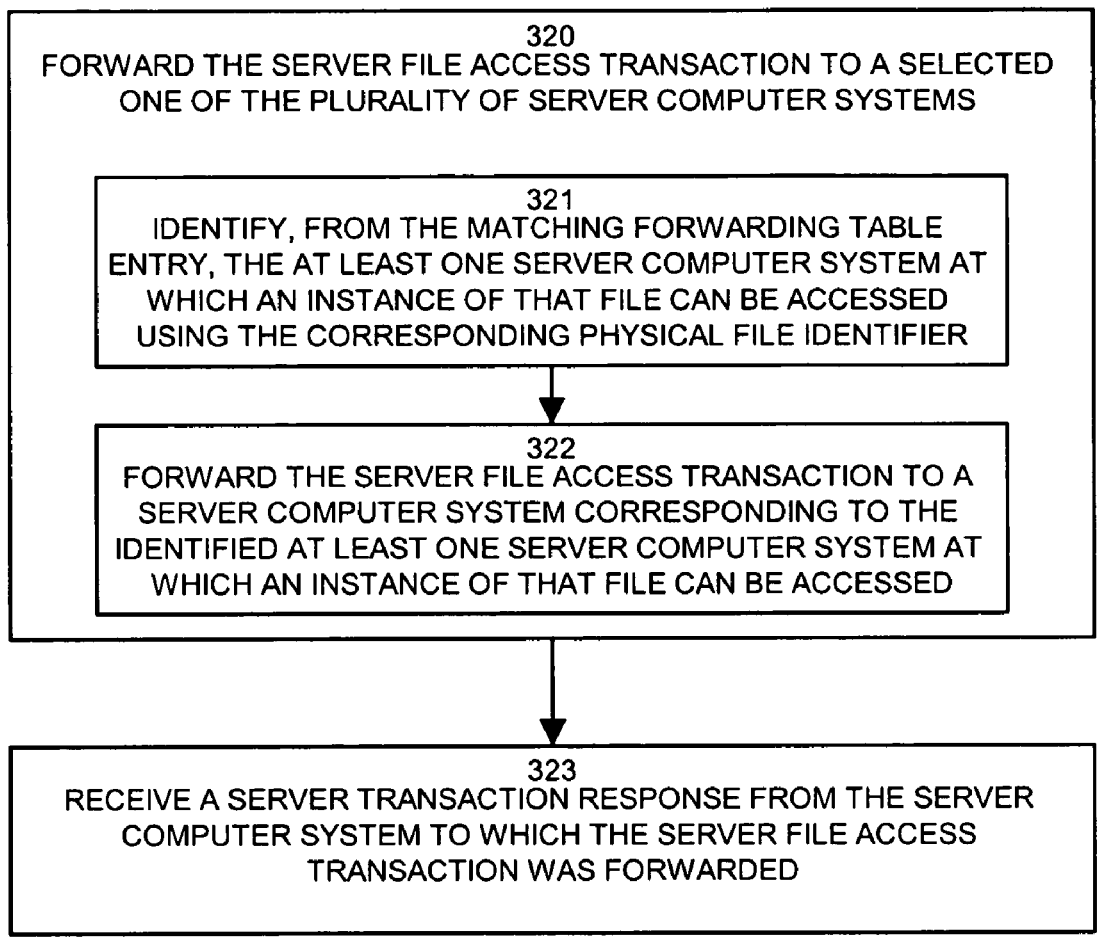
FIG. 7 is a flow chart of processing steps for forwarding translated server data access transactions to a server computer system and receiving a server response in an adaptive load balancer configured according to embodiments of the invention.

FIG. 7 is a flow chart of processing steps that the adaptive load balancer 130 performs in accordance with embodiments of the invention to forward a server data access transaction 145 to appropriate server computer system 170 for processing in relation to a server file system 175.

In step 320, the adaptive load balancer 130 forwards the server file access transaction to a selected one of the plurality of server computer systems 170. Some steps 321 through 323 show details of this process.

In step 321, the adaptive load balancer 130 identifies, from the matching forwarding table entry (i.e., the server computer system identity, of the directory file mapping table shown above), the server computer system at which an instance of the file can be accessed using the corresponding physical/ server file identifier (PFH).

In step 322, the adaptive load balancer 130 forwards the server file access transaction 145 to the server computer system 170 (e.g., 170-2 for the above example NFS READ PQRST server data access operation) corresponding to the identified server computer system (from Column 3 of the directory file mapping table) at which an instance of that file (i.e., JoeFile2.doc) can be accessed. Communications between the adaptive load balancer 130 and the server computer systems 170 can utilize, for example, the same data access protocol that is performed between the client computer systems 120 in the adaptive load balancer 130, such as NFS or CIFS. Once the server computer system 170 receives the server data access transaction 145, the server file system can processes this transaction in accordance with the specified data access operation 147 contained therein and returns a server transaction response 148 to the adaptive load balancer 130. From the server file system's perspective, the adaptive load balancer 130 appears to be a client application requesting access to a particular file, data or service within the server computer system 170.

In step 323, the adaptive load balancer 130 receives a server transaction response 148 from the server computer system 170 to which the server file access transaction 145 was forwarded in step 322. Once the adaptive transaction processor 131 receives the server transaction response 148, this response 148 is translated into a client data access response 116 as explained below.

Figure 8:
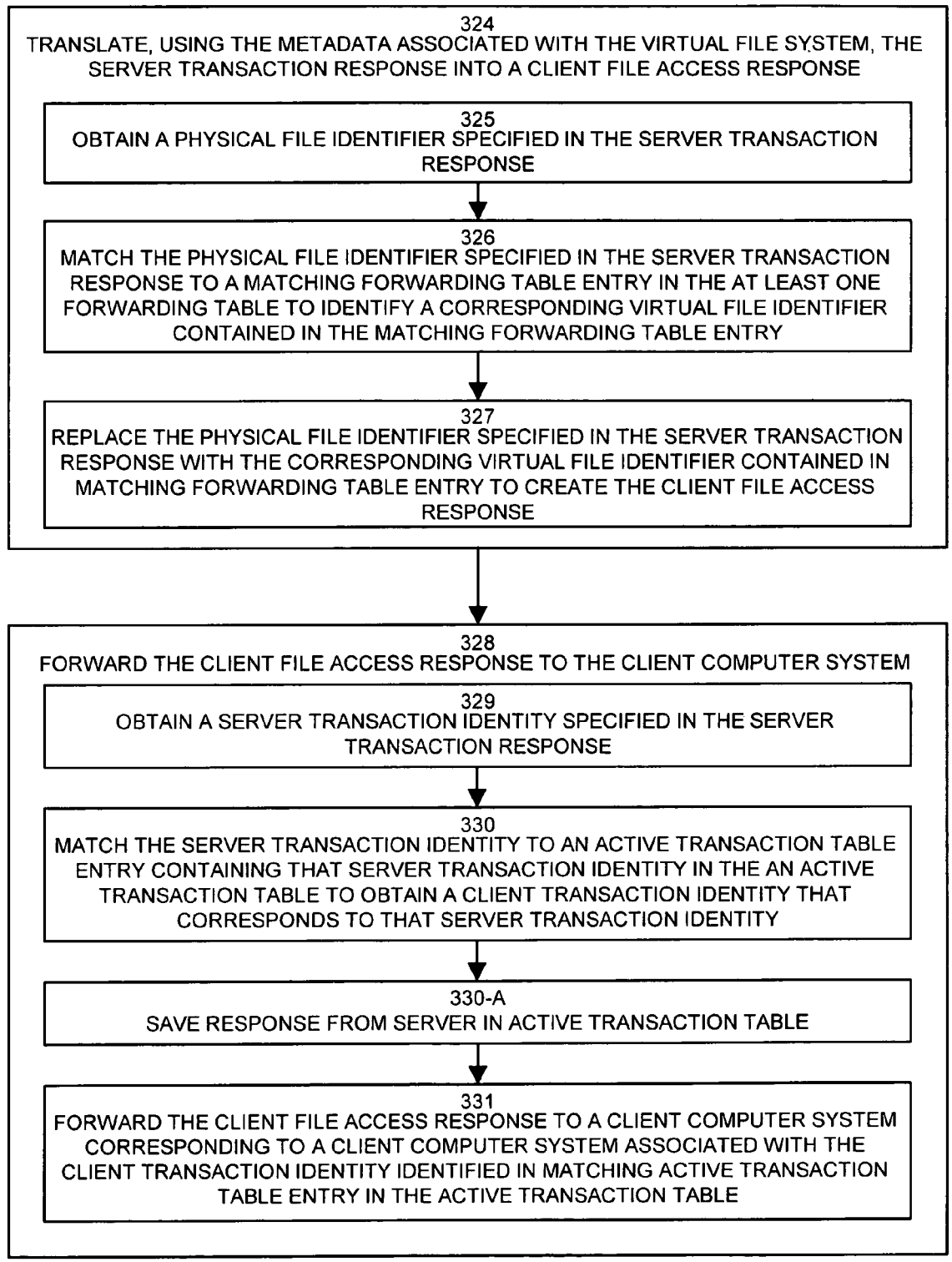
FIG. 8 is a flow chart of processing steps that show translation of a server transaction response into a client transaction response and forwarding to a client computer system from adaptive load balancer configured according to embodiments of the invention.

FIG. 8 is a flow chart of processing steps that the adaptive load balancer 130 performs in accordance with embodiments of the invention to translate server transaction response 148 into a client data access response 116 for transmission to a client computer system 120. Generally, the processing in FIG. 8 performs a reverse translation of the server transaction response 148 using the above explained data structures and tables as explained above to produce a corresponding client data access response 116.

In step 324, the adaptive load balancer 130 translates, using the metadata 132 associated with the virtual file system 135, the server transaction response 148 into a client file access response 116. Details of this processing are illustrated in sub-steps 325 through 327.

In step 325, the adaptive load balancer 130 obtains a physical file identifier (e.g., PFH) specified in the server transaction response 148. In the file system example, the physical file identifier is a server file handle corresponding to the server file handle specified in the server data access operation 147 transmitted to the server computer system 170 within the server data access transaction 145 as explained above.

In step 326, the adaptive load balancer 130 matches the physical file identifier specified in the server transaction response 148 to a matching forwarding table entry in at least one forwarding table to identify a corresponding virtual file identifier (e.g., the matching virtual file system handle) contained in the matching forwarding table entry. In other words, in steps 325 and 326, the directory file mapping table can be used to perform a reverse mapping of the physical file handle to virtual file handle.

In an alternative embodiment invention, instead of using the physical file handle specified by the server file system within the server transaction response 148 as a key in the metadata 132 to perform a reverse mapping, the server transaction identification can be used as an index in the active transaction table in order to identify a corresponding client transaction identification that the server is responding to. Using this information, the active transaction table can provide virtual data or file parameters that correspond to server data file parameters in the server transaction response 148 and translation of a server response can be done using the transaction table.

In step 327, the adaptive load balancer 130 replaces the physical file identifier specified in the server transaction response 148 (e.g., PQRST) with the corresponding virtual file identifier (e.g., 34567) contained in matching forwarding table entry to create the client file access response 116. As explained above, this reverse mapping can either be performed with the active transaction table or with the directory file mapping table, each of which are generally referred to herein as forwarding tables containing for information for translation of requests and responses between clients and server computer systems through management within the adaptive load balancer 130.

In step 328, the adaptive load balancer 130 forwards the translated client file access response 116 to the client computer system. Sub-steps 329 through 331 illustrate details of this processing in accordance with one embodiment of the invention.

In step 329, the adaptive load balancer 130 obtains a server transaction identity specified in the server transaction response 148.

In step 330, the adaptive load balancer 130 matches the server transaction identity ST to an active transaction table entry containing that server transaction identity (e.g., ST-2) in the active transaction table to obtain a client transaction identity (e.g. CT-2) that corresponds to that server transaction identity ST-2.

In step 330-A, the adaptive load balancer 130 saves the response from the server in the active transaction table. This stored information will be used to respond to duplicate client data access transactions (Step 309-B explained above).

In step 331, the adaptive load balancer 130 forwards the client file access response 116 to a client computer system 120-2 associated with the client transaction identity CT-2 identified in matching active transaction table entry (i.e., Column 2 for the for ST-2 matching entry) within the active transaction table. Accordingly, this embodiment invention uses the transaction table to perform a reverse mapping of server responses 148 to corresponding client responses 116.

Figure 9:
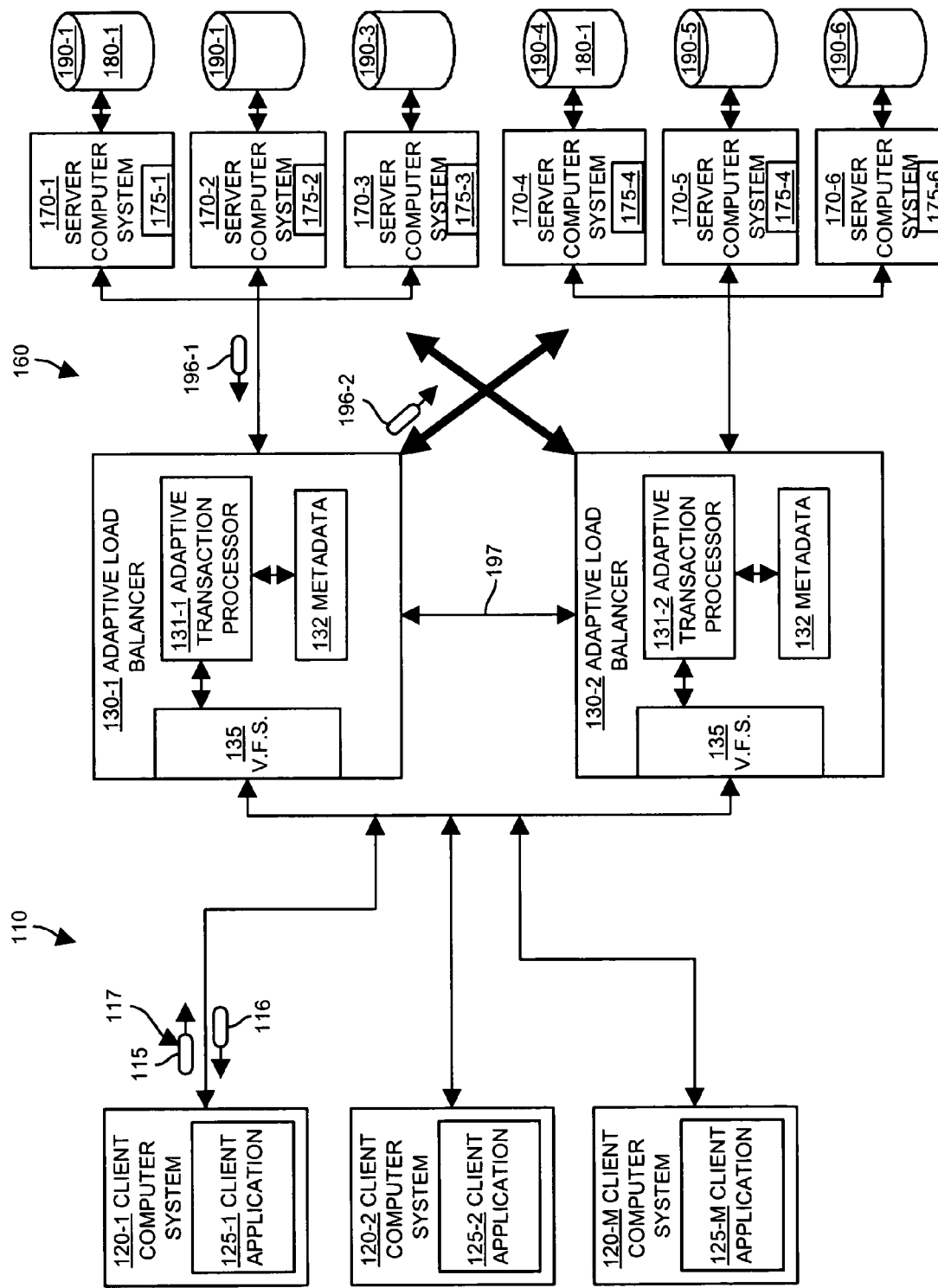
FIG. 9 is an example computing system architecture showing operation of multiple adaptive load balancers in conjunction with each other in accordance with embodiments of the invention.

FIG. 9 is an architecture of a computing system environment configured in accordance with embodiments of the invention that is similar to that described above in FIG. 1, except that in FIG. 9, multiple adaptive load balancers (to this example, 130-1 and 130-2) that operate in conjunction with each other to provide access to a plurality of server file systems 170-1 through 170-6. Operation of the load balancers 130-1 and 130-2 will be explained with respect to the flowchart of processing steps illustrated in FIGS. 10 through 14. Generally however, the adaptive load balancer 130-1 manages access to files within the server computer system 170-1 through 170-3 and the second adaptive load balancer 130-2 manages access to files within the server computer systems 170-4 through 170-6, though each can also access the other server group as well if needed (e.g., for migration or replication purposes).

Figure 10:
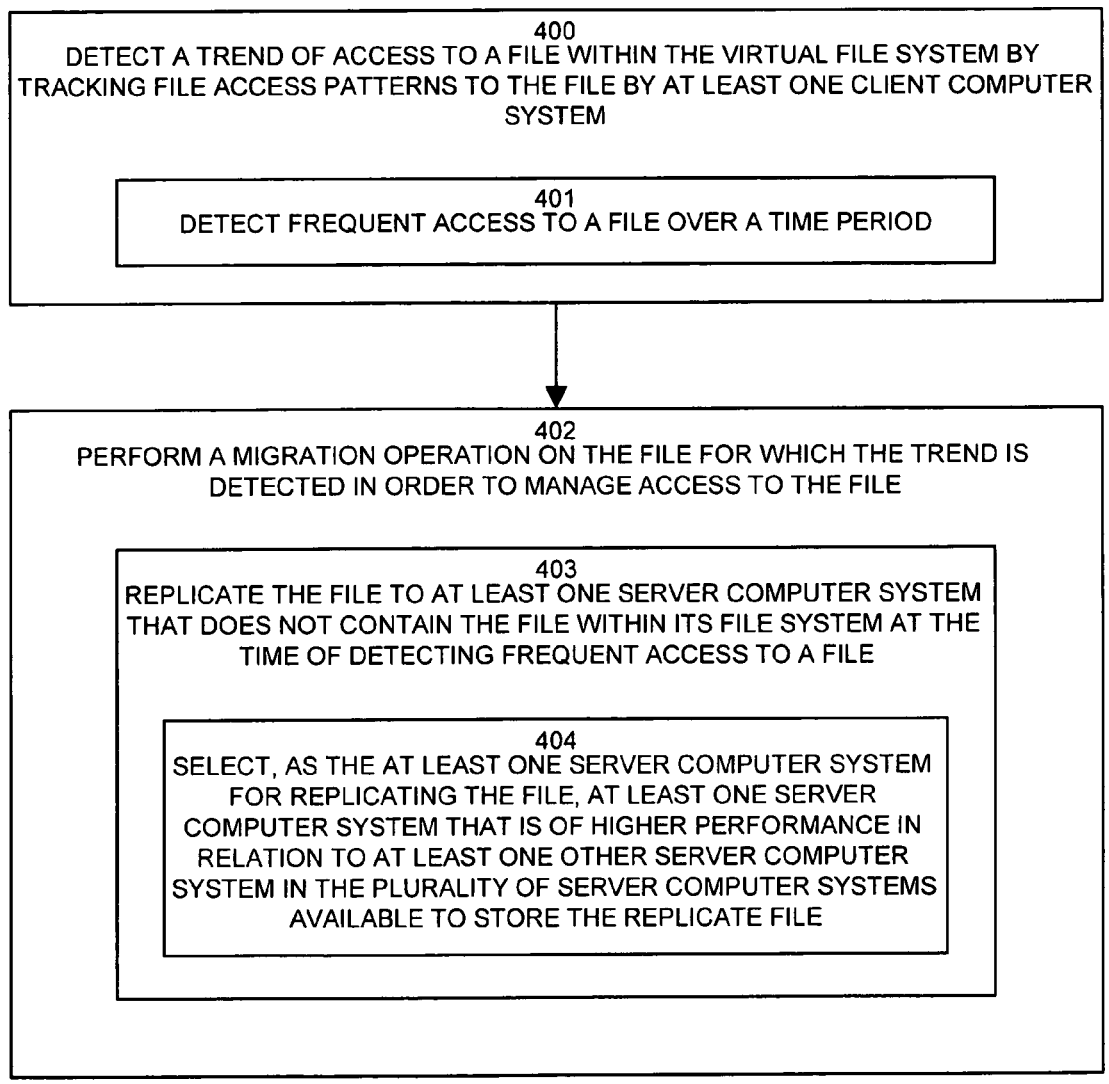
FIGS. 10 and 11 are flow charts of processing steps for detecting a data access trend and performing a migration operation of data in an adaptive load balancer configured according to embodiments of the invention.

FIG. 10 is a flow chart of processing steps that an adaptive load balancer 130 performs in accordance with embodiments of the invention to carryout migration operations between files stored within the server computer system 170-1 through 170-6.

In step 400, the adaptive load balancer 130-1 detects a trend of access to a file 180-1 within the virtual file system 135 by tracking file access patterns to the file 180-1 by client computer systems 120.

In step 401, as an example, the adaptive load balancer 130 detects frequent access to the file 180-1 over a time period. The frequent access can be made by many client computer systems 120-1 through 120-M or by a single client computer system (e.g., 120-1) or any combination thereof.

In step 402, in response to detecting the trend of access, the adaptive load balancer 130 performs a migration operation on the file 180-1 for which the trend is detected in order to manage access to the file 180. In this example, the migration operations is a replication operation.

In step 403, the adaptive load balancer 130 replicates 196 the file 180-1 to at least one server computer system 170-4 that does not contain the file 180-1 within its file system 175-4 at the time of detecting frequent access to a file 180-1. The replication operation can involve the adaptive transaction processor 131-1 using a sequence 196 of one or more NFS operations such as READS 196-1 and WRITES 196-2 to read 196-1 the file from the server file system 175-1 within the server computer system 170-1 and write 196-2 a corresponding copy 180-1 of the file within the file system 175-4 in the server computer system 170-4. In addition, the adaptive transaction processor 131-1 can perform a metadata update operation 197 by informing the second adaptive transaction processor 131-2 operating within the second adaptive load balancer 130-2 of the existence of the copy of the file 180-1 within the server computer system 170-4.

Alternatively, the replication can be carried out by having the adaptive load balancer 130-1 appear as a client computer system to the adaptive load balancer 130-2 and provide a sequence of access commands to cause creation of the file 181 within an appropriate server computer system 170-4 through 170-6 under management of the second adaptive load balancer 130-2. In other words, the first scenario the first adaptive load balancer 130-1 copies the file itself to the second server computer system 170-4 and then informs the second adaptive load balancer 130-2 so that the metadata 132-2 is properly updated. In the second or alternative scenario, the first adaptive load balancer 130-1 operate as a client with respect to the second adaptive load balancer 130-2 thus causing the second adaptive load balancer 132 to create a second instance of the file 180-1. In this manner, since multiple copies of the file for which frequent access was detected are now distributed within multiple locations, client computer systems are offered access to this file from multiple adaptive load balancers thus reducing the load or demand for the file from the first adaptive load balancer 131 the detected frequent access to the file.

Sub-step 404 illustrates another alternative embodiment of the invention in which the adaptive load balancer 130 selects, as the server computer system for replicating the file, at least one server computer system that is of higher performance in relation to at least one other server computer system in the plurality of server computer systems available to store the replicated file. In this manner, this embodiment of the invention causes the copy of the file created during the read and write replication operations 196-1 and 196-2 to be placed on a high-performance server computer system due to increased demand for access to the file by client computer systems.

As a result of this embodiment of the invention, the virtual file system 135 provided by the adaptive load balancer provides at least one file accessible to the client computer system that is replicated within the first and second file systems 175-1 and 175-4 on the first and second server computer systems 170-1 and 170-4. It is to be understood that embodiments of the invention are not limited to configurations in which groups of server computer systems are under control of certain adaptive load balancers 130. In an alternative arrangement, each adaptive load balancer 130-1 and 130-2 has equivalent access to all server file systems of the entire set of server computer systems 170-1 through 170-6 and the metadata 132 is equally shared between adaptive load balancers 130-1 and 130-2. In such a configuration, a single virtual file system 135 is presented by both adaptive load balancers 130.

Figure 11:
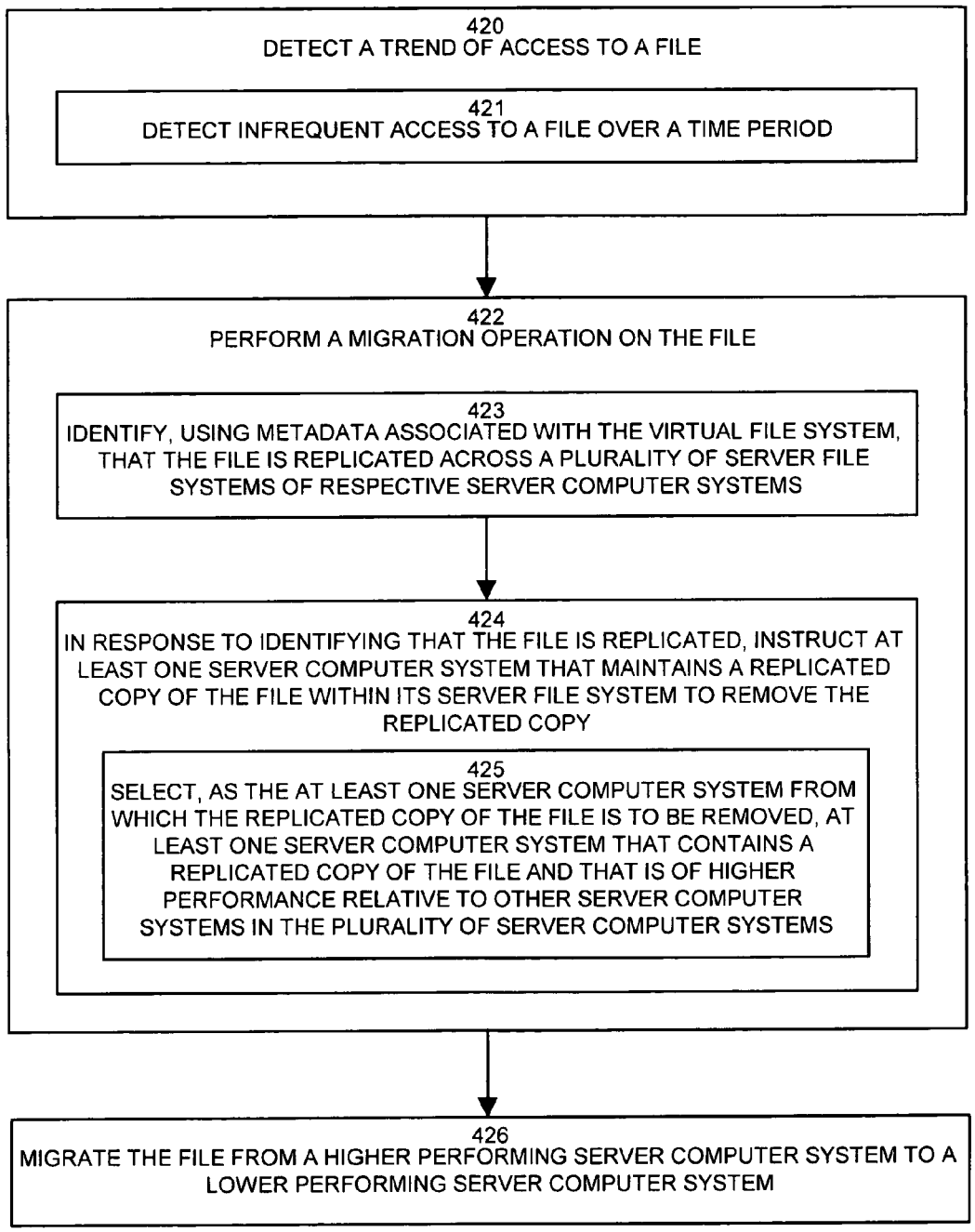

FIG. 11 is a flow chart of processing steps that the adaptive load balancer 130 performs in accordance with embodiments of the invention in which a trend of access to one or more files is detected as decreasing over time.

In step 420 the adaptive load balancer 130 detects a trend of access to a file within the virtual file system by tracking file access patterns to the file client computer systems 120.

In step 421, the adaptive load balancer 130 detects infrequent access to a file over the time period. As an example, if a replicated file 180-1 exists in multiple server file systems 175-1 and 175-4 of multiple server computer systems 170-1 and 170-4 (as a result of the replication processing explained above with respect to FIG. 10), it may be the case that over time, client demand for access to this file decreases and thus maintaining replicated copies of the file within multiple server computer systems results in an inefficient use of server computer system storage space. In response to this trend of decreasing access, processing can proceed in one embodiment of the invention to step 422 (i.e., in situations in which the file for which the trend of access is detected is replicated across a plurality of server computer systems). Alternatively, if only a single copy of the file exists within a single server computer system associated with the virtual file system 135, processing can proceed to step 426 to be explained later.

In step 422, the adaptive load balancer 130 performs a migration operation on the file. In this example, the migration operation can be removal of replicated copies of the file and can further include accounting for server performance metrics to determine which server computer system 170 should maintain at least one (i.e., the last remaining) copy of the file.

In step 423, the adaptive load balancer 130 identifies, using metadata 132 associated with the virtual file system 135, that the file 180-1 is replicated across a plurality of server file systems of respective server computer systems (e.g., 170-1 and 170-4).

In step 424, in response to identifying that the file is replicated, the adaptive load balancer 130 instructs at least one server computer system (e.g., 170-4) that maintains a replicated copy of the file within its server file system to remove the replicated copy 180-1. This makes the storage space occupied by this replicated copy of the file 180-1 now available for other uses within the virtual file system 135.

As an enhancement to the embodiment discussed above respect to step 424, in step 425, the adaptive load balancer 130 selects, as the server computer system from which the replicated copy of the file is to be removed, at least one server computer system that contains a replicated copy of the file 180-1 and that is of higher performance relative to other server computer systems in the plurality of server computer systems. In this manner, replicated copies of the file are removed (i.e., deleted) from high-performance server computer systems 170 since demand for access to the file(s) has decreased. This makes additional storage space available on those high-performance computing systems for storage of files for which demand is greater.

As explained above, in situations in which a singular copy of a file exists within only a single server computer system associated with the virtual file system 135, if a trend of access to this file is detected that indicate a decreased requirement for access to this file, processing can proceed from step 421 to step 426.

In step 426, the adaptive load balancer 130 migrates the file 180 from a higher performing server computer system to a lower performing server computer system. In this manner, the embodiment of step 426 causes files that are less frequently accessed and that are replicated to be moved to lesser or slower performing server computer systems thus freeing up storage space and processing resources within higher performing server computer systems to handle access to files having higher demands or access requirements.

Figure 12A:
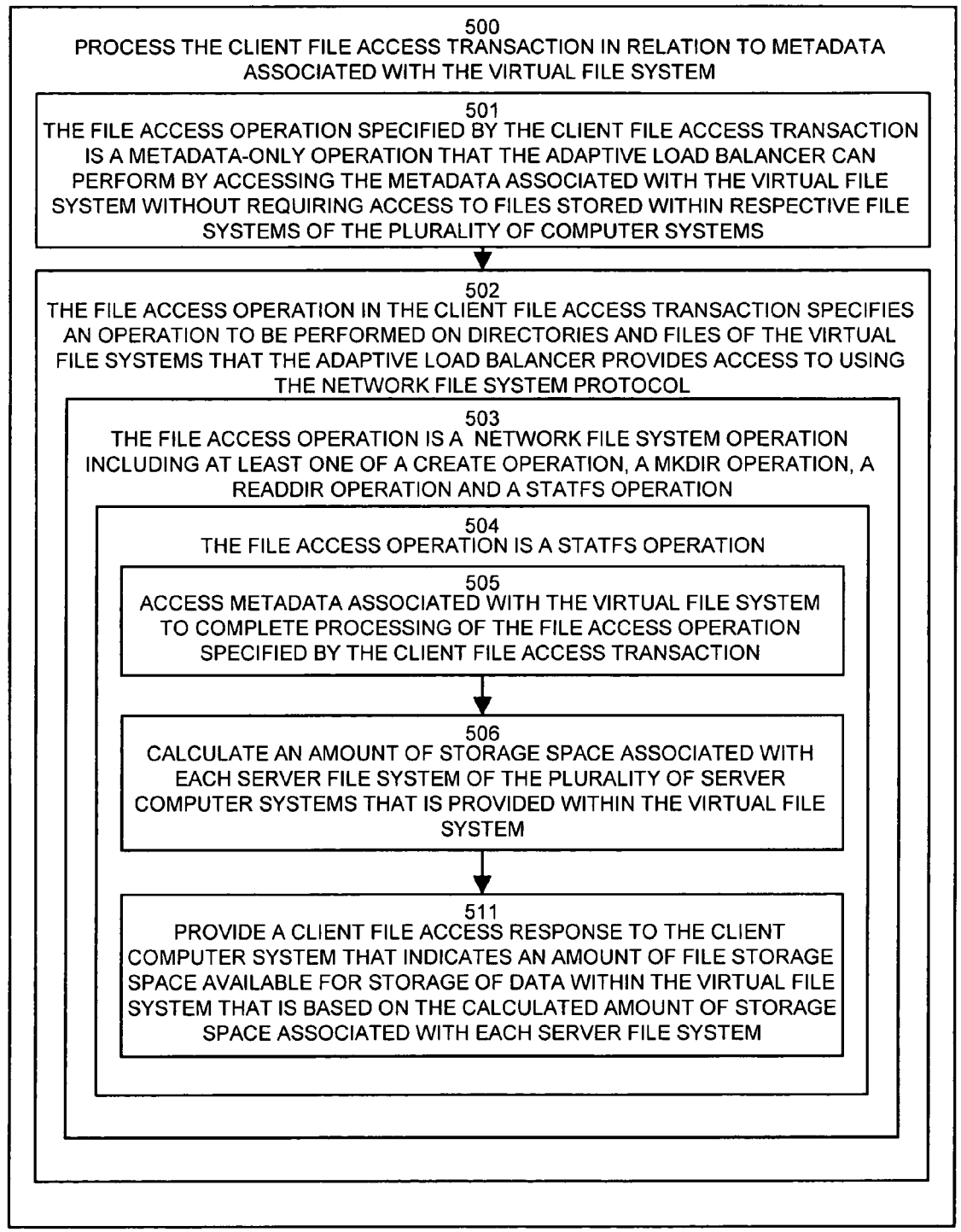
FIG. 12A is a flow chart of processing steps for processing metadata-only transactions in an adaptive load balancer configured according to embodiments of the invention.
Figure 12B:
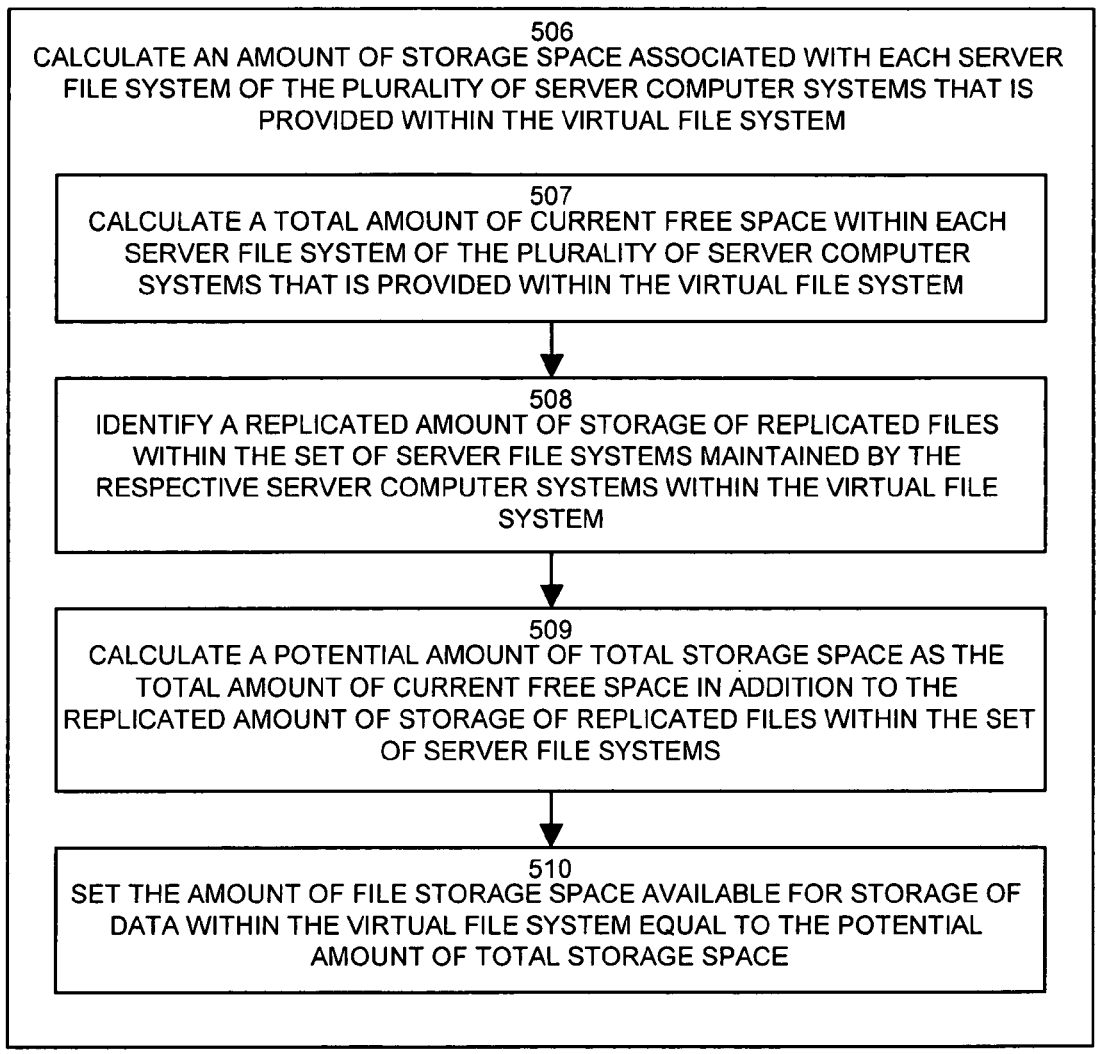
FIG. 12B is a flow chart of processing steps that show processing an NFS STATFS operation in an adaptive load balancer configured according to embodiments of the invention.

FIGS. 12A and 12B are flow charts of processing steps that the adaptive load balancer 130 performs in accordance with embodiments of the invention to process data access operations that are metadata specific. As mentioned above, since the virtual data system 135 includes metadata 132 containing mapping information between the virtual data system parameters and physical or server data system parameters of information maintained in respective server computer systems, certain data access operations can be processed completely by the adaptive load balancer via access to the metadata 132 without requiring translation of the data access operations into a corresponding server data access transaction 145. In other words, the adaptive transaction processor 131 can satisfy and process certain data access operations 117 by accessing only the metadata 132. The processing steps 500 through 511 illustrate example embodiments of the invention that perform such processing.

In step 500, the adaptive load balancer 130 processes the client file access transaction 115 in relation to metadata 132 associated with the virtual file system.

In sub-step 501 in one embodiment, the file access operation specified by the client file access transaction is a metadata-only operation that the adaptive load balancer 130 can perform by accessing the metadata associated with the virtual file system 135 without requiring access to files 180 stored within respective file systems 175 of the plurality of computer systems 170.

In an alternative operation, in step 502, the file access operation 117 in the client file access transaction 115 specifies an operation to be performed on directories and files of the virtual file system 135 that the adaptive load balancer 130 provides access to using the Network File System protocol. Sub-steps 503 through 511 provide examples of NFS specific processing with respect to metadata 132.

Step 503 shows example embodiments of step 502 in which the file access operation is a Network File System operation including at least one of a CREATE operation, a MKDIR operation, a READDIR operation and a STATFS operation.

In step 504 and sub-steps 505 through 511, a specific example of processing is shown in which the file access operation is an NFS STATFS operation. An NFS STATFS operation is a request to obtain file system status concerning available storage space within the file system. If the adaptive load balancer receives such a command, the adaptive load balancer operates to report a collective amount space available within the aggregated server file systems 175 of each server computer system 170.

In particular, in step 505, for STATFS, the adaptive load balancer 130 accesses metadata 132 associated with the virtual file system 135 to complete processing of the STATFS file access operation 117 specified by the client file access transaction 115.

In step 506, the adaptive load balancer 130 calculates an amount of storage space associated with each server file system 175 of the plurality of server computer systems 170 that is provided within the virtual file system 135. This information can be maintained within the metadata 132 by calculating a sum total of the size of all files referenced by the metadata 132.

FIG. 12B shows sub-steps 507 through 510 that illustrate an example of processing an NFS STAFS command according to one embodiment of the invention.

Specifically, in FIG. 12B in sub-step 507, the adaptive load balancer 130 calculates a total amount of current free space within each server file system 175 of the plurality of server computer systems that is provided within the virtual file system 135. The adaptive transaction processor 131 can obtain this value by having predetermined knowledge of the total amount of raw disk space available within each server file system 175. From this amount, the adaptive transaction processor 131 can subtract the amount of space occupied by files identified within the metadata 132. The size of each file identified by the metadata 132 can be contained, for example, within the directory file mapping table within the "other parameter mappings" column, shown in the example directory file mapping table discussed above. This calculation thus produces a total amount of current free space available within the virtual file system 135 but does not account for replicated files that could be deleted or removed.

As such, in step 508, the adaptive load balancer 130 identifies a replicated amount of storage of replicated files within the set of server file systems 175 maintained by the respective server computer systems 170 within the virtual file system 135.

In step 509, the adaptive load balancer 130 calculates a potential amount of total storage space as the total amount of current free space in addition to the replicated amount of storage of replicated files within the set of server file systems.

In step 510, the adaptive load balancer 130 sets the amount of file storage space available for storage of data within the virtual file system equal to the potential amount of total storage space. In this manner, the amount of total storage space includes the space occupied by replicated copies of a file that could be deleted or removed if necessary in order to make additional space available for storing of new data.

Returning attention now back to FIG. 12A, in step 511, the adaptive load balancer 130 provides a client file access response 116 to the requesting client computer system that indicates an amount of file storage space available for storage of data within the virtual file system 135 that is based on the calculated amount of storage space associated with each server file system 175 and accounts for space occupied by replicated copies of the files that could be deleted.

Figure 13:
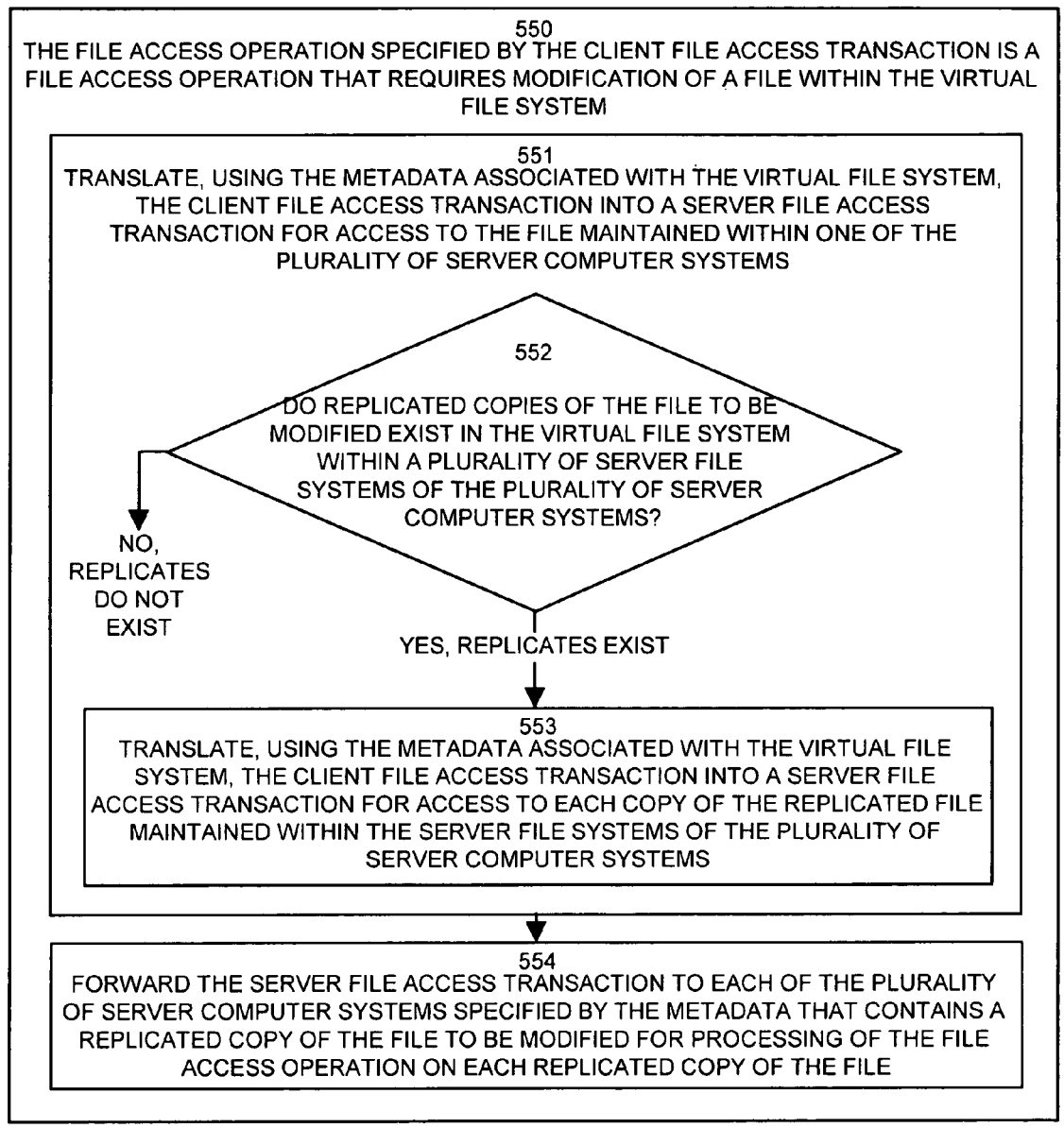
FIGS. 13 and 14 are a flow chart of processing steps for processing file access operations when replicated files exist in an adaptive load balancer configured according to embodiments of the invention.

FIG. 13 is a flow chart of processing steps that the adaptive load balancer 130 performs in accordance with embodiments of the invention to process transactions that require access to files within server file systems 175 in situations in which replicated copies of such files exist. As an example, the processing of the flow chart steps in FIG. 13 can be used to handle situations in which an NFS WRITE data access operation 117 is received that requires writing data to a file that contains multiple replicated copies within the virtual file system 135.

In step 550 in this example embodiment, the file access operation specified by the client file access transaction is a file access operation that requires modification of a file within the virtual file system 135. In other words, in this embodiment the file access operation 117 requires the adaptive load balancer to create a server data access transaction 145 to access the particular instance of a file within a server computer system 170.

In step 551, the adaptive load balancer 130 translates, using the metadata 132 associated with the virtual file system 135 (as explained above), the client file access transaction 115 into a server file access transaction 145 for access to the file 180 maintained within one of the plurality of server computer systems 170. Sub-steps 552 through 554 explained such access according to embodiments of the invention with respect to replicated instances of files.

In step 552, the adaptive load balancer 130 identifies if replicated copies of the file to be modified exist in the virtual file system within a plurality of server file systems of the plurality of server computer systems.

In step 553, if replicated copies exist, the adaptive load balancer 130 translates, using the metadata 132 associated with the virtual file system 135, the client file access transaction 115 into a server file access transaction 145 for access to each copy of the replicated file maintained within the server file systems of the server computer systems (e.g., 180-1 on both the server computer systems 170-1 and 170-4 illustrated in FIG. 9).

In step 554, the adaptive load balancer 130 forwards the server file access transaction 145 to each of the plurality of server computer systems 170-1 and 170-4 (in the example of FIG. 9) specified by the metadata 132 that contains a replicated copy of the file to be modified for processing of the file access operation on each replicated copy of the file. In other words, in the embodiment illustrated in FIG. 13, a modification made to a file is carried out on each replicated copy of that file within each server file system 175 of each server computer system 170 that maintains a copy of that file.

Figure 14:
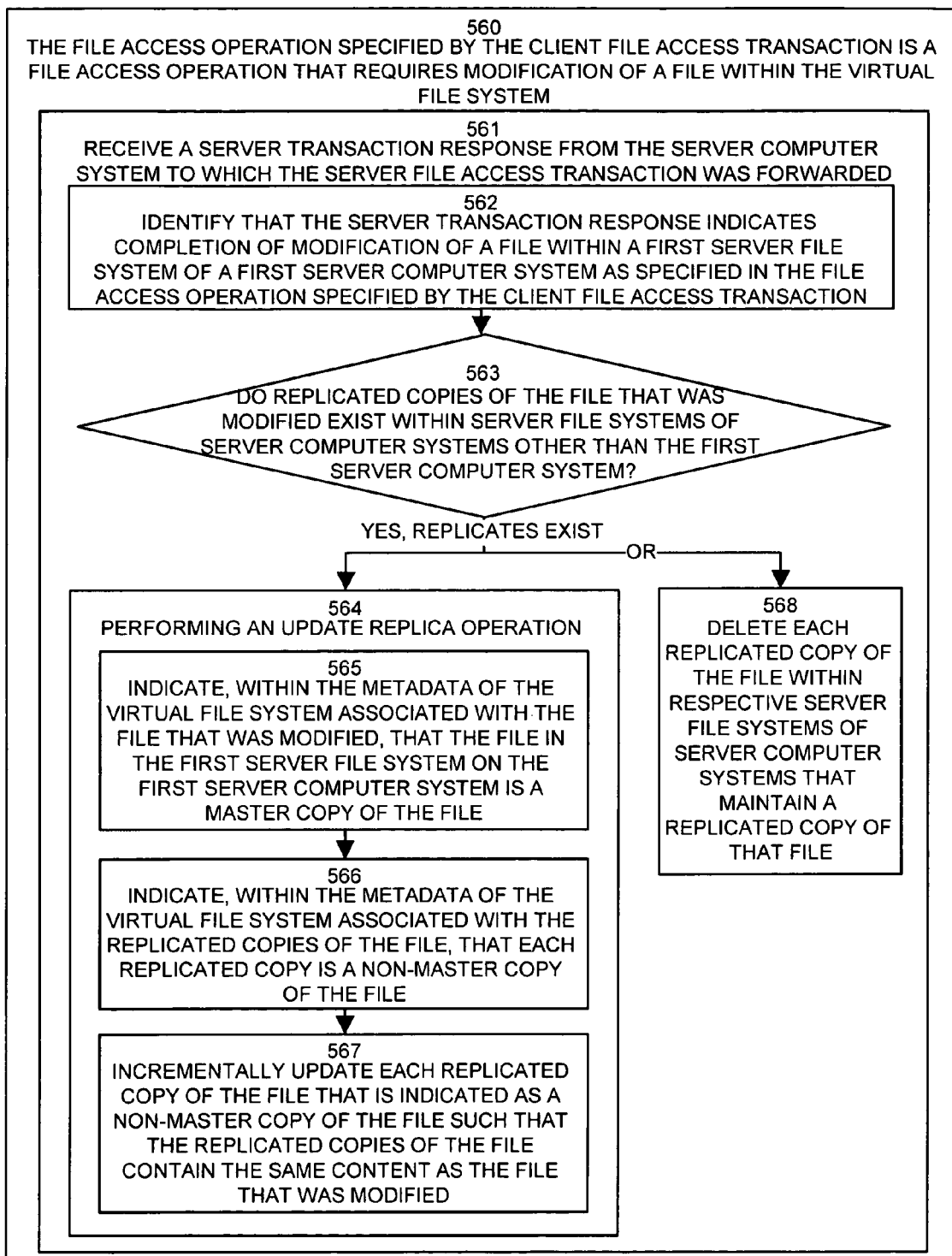

FIG. 14 is a flow chart of processing steps that the adaptive load balancer 130 performs in accordance with embodiments of the invention to provide an alternative to access management of replicated files within the virtual file system 135. In the embodiment illustrated in FIG. 14, processing of a file access operation 117 is initially performed as explained in the initial example with respect to access to a single version of the file within a single server computer system 170. Thereafter however, the processing of steps 560 through 568 take place or occur upon receipt of the server transaction response 148.

In step 560 in this example embodiment, the file access operation specified by the client file access transaction is a file access operation that requires modification of a file within the virtual file system by creation of a server file access transaction 145 for into a specific server computer system containing a selected version of the file (that may or may not be replicated). Note if the files are replicated, during the processing of server selection using the metadata 132 as explained above, one instance of the file can be designated as a master copy of the file and the server file system 175 that maintains a master copy would be selected as the file system to which the server data access transaction 145 is transmitted or forwarded.

In step 561, the adaptive load balancer 130 receives a server transaction response 148 from the server computer system (e.g., 170-1) to which a server file access transaction 145 was forwarded.

In step 562, the adaptive load balancer 130 identifies that the server transaction response 148 indicates completion of modification of a file within a first server file system 175-1 of a first server computer system 170-1 as specified in the file access operation 117 specified by the client file access transaction 115.

In step 563, the adaptive load balancer 130 identifies if replicated copies of the file that was modified exist within other server file systems 175-2 through 175-N of other server computer systems 170-2 through 170-N (i.e., other than the first server computer system 170-1).

In step 564, if replicated copies of the file that was modified exist, then the adaptive load balancer 130 performs an update replica operation as explained below to update each replica copy of the file to contain the modifications made to the first or master version of the file stored within server computer system 170-1.

In step 565, the adaptive load balancer 130 indicates, within the metadata 132 of the virtual file system 135 associated with the file that was modified, that the file in the first server file system 175-1 on the first server computer system 170-1 is a master copy of the file. The master copy of the file always contains the most complete or up-to-date version of the file.

In step 566, the adaptive load balancer 130 indicates, within the metadata 132 of the virtual file system associated with the replicated copies of the file, that each replicated copy is a non-master copy of the file.

In step 567, the adaptive load balancer 130 incrementally updates each replicated copy of the file that is indicated as a non-master copy of the file such that the replicated copies of the file contain the same content as the file that was modified. In this manner, the processing reflected by steps 564 through 567 reflected embodiment of the invention in which replica copies of a file are incrementally updated (e.g., as time permits) after a master copy of the file is modified according to the data access operation 117 specified client.

In an alternative configuration, in step 568, if replicated copies of the file that was modified exist within different server file systems 175, then the adaptive load balancer 130 deletes each replicated copy of the file within respective server file systems 175 of server computer systems 170 that maintain a replicated copy of that file, such that file that was modified in the first server file system 175-1 is the only copy of that file that remains accessible to client computer systems 120 within the virtual file system 135. In this manner, if a replicated file exists and a modification is made to one instance of the replicated file, this embodiment of the invention causes the remaining replicated copies of the file to be deleted so that all accesses will now be directed to the modified version and no replicated copies will exist. Such embodiment would primarily be used for read-only file systems in which modification to replicated files would really take place.

Alternative arrangements of the invention include rearranging the processing steps explained above in the flow charts in such a way that the overall effect of the invention is the same. It is to be thus understood by those skilled in the art that the particular arrangement of processing steps in many instances does not specify implementation of embodiments of the invention. As such, those skilled in the art of software, hardware and network device development and computer and network-related technologies will understand that there can be many ways and orders of representing the processing operations explained above and such alternative embodiments of the software code and/or hardware configurations will still achieve the overall effects, features and advantages of the invention as explained herein.

In addition, embodiments of the invention are not limited to operation in a file system environment. Rather, embodiments of the invention provide an architecture for virtualizing any type of data system provided form a server computer system. Web services are another example and the term virtual data system includes, for example, virtualizing any type of object based distributed services architecture.

Using web services as an example, the adaptive load balancer can be used as explained herein to provide a web based metadata layer between clients and servers to allow access, for example, to a file or directory via a URL call from a client such as a web browser. The adaptive load balancer as explained herein can use the metadata to map a URL call received, for example, via HTTP, to a particular NFS or CIFS file access command transferred to a file server computer system on the back-end. As such, the term "data" as used in "virtual data system" herein includes such things as file, or any type of data or object in the sense that a web service is simply another type of object based distributed service architecture. In another alternative, HTTP is used as a front-end access method and the distributed metadata layer discussed above using NFS/CIFS is used to map requests to the back end servers.

A web service is defined by a service definition object. Many web service instances of the same service definition can be instantiated and in a typical implementation, XML is the markup language used to describe the web service and WSDL (like an XML template for service creation) is the schema used to define the web service. Accordingly, just as the examples above explained how embodiments of the invention virtualize file objects, alternative embodiments provide virtualizations of service objects used in a web services environment. In such configurations, many web service instances can be created, migrated or aggregated together using the adaptive load balancer and metadata processing techniques explained herein (where the metadata is web services object information) to perform or provide a virtualized data service or system just as files are replicated, migrated or aggregated to provide a virtual file system. Service objects can contain external object attributes that embodiments of this invention represent in metadata much the same way that files contain the examples of metadata attributes explained above (e.g., path, file name, etc.).

Accordingly, alternative embodiments of the invention provide a virtual data system by implementing an object infrastructure layer that is used to move web service objects around (i.e., between servers in response to web service requests) the same way files and file system requests are processed are as explained above. Accordingly, embodiments of the invention are not limited to operation in a file system application, but are intended to be generally applicable to any type of distributed service architecture. Accordingly, embodiments of the invention are not limited to the processing arrangements explained above.

What is claimed is:

1. A method for processing client file access transactions, the method comprising:

presenting a virtual file system in an adaptive load balancer to a client computer system, the virtual file system providing access to an aggregated set of files stored by a plurality of server file systems respectively associated with a plurality of server computer systems;

receiving a client file access transaction from the client computer system, the client file access transaction specifying a file access operation to be performed relative to the virtual file system presented to the client computer system;

processing the client file access transaction in relation to metadata associated with the virtual file system, the metadata including translation data, to:
a) access metadata associated with the virtual file system to complete processing of the file access operation specified by the client file access transaction if the file access operation does not involve accessing a file stored by at least one of the plurality of server file systems; and
b) if the file access operation involves accessing a file stored by at least one of the plurality of server file systems, then translating, using the metadata, the client file access transaction into a server file access transaction for access to the file maintained within at least one of the plurality of server computer systems according to the file access operation specified by the client file access transaction by:
obtaining a virtual file identifier specified in the client file access transaction;
matching the virtual file identifier specified in the client file access transaction to a matching forwarding table entry in a forwarding table to identify a corresponding physical file identifier from the matching forwarding table entry;
creating the server file access transaction by replacing the virtual file identifier specified in the client file access transaction with the corresponding physical file identifier in the matching forwarding table entry, assigning a server transaction identity to the created server file access transaction, determining if an active transaction table includes an active transaction table entry that corresponds to the client transaction identity, and if not, creating an active transaction table entry including the assigned client transaction identity and an identity of the client computer system from which the client file access transaction was received;
storing the server transaction identity in an active transaction table entry that includes the client transaction identity of the received client file access transaction; and
forwarding the server file access transaction to a selected one of the plurality of server computer systems by identifying, from the matching forwarding table entry, the at least one server computer system at which an instance of that file can be accessed using the corresponding physical file identifier and forwarding the server file access transaction to a server computer system corresponding to the identified at least one server computer system.

2. The method of claim 1 wherein if the file access operation requires access to a file stored by the plurality of server file systems, the method comprises:
forwarding the server file access transaction to a selected one of the plurality of server computer systems specified by the metadata for processing of the file access operation specified by the client file access transaction by the selected one of the plurality of server computer systems;
receiving a server transaction response from the server computer system to which the server file access transaction was forwarded;
translating, using the metadata associated with the virtual file system, the server transaction response into a client file access response; and
forwarding the client file access response to the client computer system from which the client file access transaction was received.

3. The method of claim 2 comprising:
maintaining the metadata associated with the virtual file system in the forwarding table, the forwarding table containing forwarding table entries that provide a mapping of virtual file system parameters to physical file system parameters including a directory location, the mapping including:
a mapping of virtual file identifiers corresponding to each available file accessible by client computer systems in the virtual file system to:
i) at least one corresponding physical file identifier; and
ii) at least one server computer system of the plurality of server computer systems at which an instance of that file can be accessed using that corresponding physical file identifier.

4. The method of claim 3 wherein the forwarding table includes:
a directory location mapping table containing a mapping of virtual file identities of parent and child directories within the virtual file system, the parent and child directories representing an aggregation of directory structures present within respective server file systems of the plurality of file servers; and
a set of directory file mapping tables, one for each directory in the virtual file system, each directory file mapping table containing a mapping of virtual file identities of files within the virtual file system of that directory to physical file identities of a corresponding file and server computer system and within an aggregation of the respective server file systems of each of the plurality of file servers.

5. The method of claim 4 wherein processing the client file access transaction in relation to metadata associated with the virtual file system comprises:
obtaining a virtual file identity within the client file access transaction;
comparing a directory portion of the virtual file identity to the directory location mapping table to identify a destination virtual file identity of a directory in the virtual file system that contains a file to be accessed according to the file access operation specified in the client file access transaction;
identifying a specific directory file mapping table within the set of directory file mapping tables that corresponds to the destination virtual file identity of the directory in the virtual file system that contains a file to be accessed according to the file access operation specified in the client file access transaction;
within the specific identified directory file mapping table, comparing a file portion of the virtual file identity to directory file mapping table entries to identify at least one matching directory file mapping table entry that contains the file portion of the virtual file identity in order to identify a server computer system of the plurality of server computer systems and a physical file identity of a file on that server computer system that corresponds to the file to be accessed according to the file access operation specified in the client file access transaction.

6. The method of claim 5 wherein comparing a file portion of the virtual file identity to directory file mapping table entries to identify at least one matching directory file mapping table entry comprises:
identifying a plurality of matching directory file mapping table entries that each contains the file portion of the virtual file identity, thus indicating that the file to be accessed according to the file access operation specified in the client file access transaction is replicated in at least two locations within the plurality of server computer systems.

7. The method of claim 2 wherein the plurality of server computer systems includes:
   a first server computer system that provides a first server file system having a first set of files available within the virtual file system;
   a second server computer system that provides a second server file system having a second set of files available within the virtual file system; and
   wherein:
      the first set of files contains different files than the second set of files;
      the adaptive load balancer presents the first and second set of files as the aggregated set of files without identifying to the client computer system that the first and second set of files are stored on respective first and second server computer systems; and
      the adaptive load balancer uses the metadata associated with the virtual file system to manage access to the first and second set of files within the first and second server computer systems on behalf of client computer systems requesting access to the set of files.

8. The method of claim 7 wherein the virtual file system provided by the adaptive load balancer provides at least one file accessible to the client computer systems that is replicated within the first and second file systems on the first and second server computer systems.

9. The method of claim 2 comprising:
   detecting a trend of access to a file within the virtual file system by tracking file access patterns to the file by at least one client computer system;
   in response to detecting the trend of access, performing a migration operation on the file for which the trend is detected in order to manage access to the file.

10. The method of claim 9 wherein detecting a trend of access to a file comprises:
   detecting frequent access to a file over a time period;
   and wherein performing a migration operation on the file comprises:
   replicating the file to at least one server computer system that does not contain the file within its file system at the time of detecting frequent access to a file.

11. The method of claim 10 wherein replicating the file to at least one server computer system that does not contain the file within its file system at the time of detecting frequent access to a file comprises:
   selecting, as the at least one server computer system for replicating the file, at least one server computer system that is of higher performance in relation to at least one other server computer system in the plurality of server computer systems available to store the replicate file.

12. The method of claim 9 wherein detecting a trend of access to a file comprises:
   detecting infrequent access to a file over a time period; and wherein performing a migration operation on the file comprises:
   identifying, using metadata associated with the virtual file system, that the file is replicated across a plurality of server file systems of respective server computer systems;
   in response to identifying that the file is replicated, instructing at least one server computer system that maintains a replicated copy of the file within its server file system to remove the replicated copy.

13. The method of claim 12 wherein instructing at least one server computer system that maintains a replicated copy of the file within its server file system to remove the replicated copy comprises:
   selecting, as the at least one server computer system from which the replicated copy of the file is to be removed, at least one server computer system that contains a replicated copy of the file and that is of higher performance relative to other server computer systems in the plurality of server computer systems.

14. The method of claim 9 wherein detecting a trend of access to a file comprises:
   detecting infrequent access to a file over a time period;
   and wherein performing a migration operation on the file comprises:
   migrating the file from a higher performing server computer system to a lower performing server computer system.

15. The method of claim 2 wherein the file access operation specified by the client file access transaction is a file access operation that requires modification of a file within the virtual file system; and
   wherein receiving a server transaction response from the server computer system to which the server file access transaction was forwarded comprises:
   identifying that the server transaction response indicates completion of modification of a file within a first server file system of a first server computer system as specified in the file access operation specified by the client file access transaction;
   identifying if replicated copies of the file that was modified exist within server file systems of server computer systems other than the first server computer system;
   and if replicated copies of the file that was modified exist, then performing an update replica operation comprising:
   i) indicating, within the metadata of the virtual file system associated with the file that was modified, that the file in the first server file system on the first server computer system is a master copy of the file;
   ii) indicating, within the metadata of the virtual file system associated with the replicated copies of the file, that each replicated copy is a non-master copy of the file.

16. The method of claim 15 wherein performing the update replica operation further comprises:
   incrementally updating each replicated copy of the file that is indicated as a non-master copy of the file such that the replicated copies of the file contain the same content as the file that was modified.

17. The method of claim 2 wherein the file access operation specified by the client file access transaction is a file access operation that requires modification of a file within the virtual file system; and
   wherein receiving a server transaction response from the server computer system to which the server file access transaction was forwarded comprises:
   identifying that the server transaction response indicates completion of modification of a file within a first server file system of a first server computer system as specified in the file access operation specified by the client file access transaction;
   identifying if replicated copies of the file that was modified exist within server file systems of server computer systems other than the first server computer system; and
   if replicated copies of the file that was modified exist, then deleting each replicated copy of the file within respective server file systems of server computer systems that maintain a replicated copy of that file, such that file that was modified in the first server file system is the only copy of that file that remains accessible to client computer systems within the virtual file system.

18. The method of claim 2 wherein the file access operation specified by the client file access transaction is a file access operation that requires modification of a file within the virtual file system; and wherein translating, using the metadata associated with the virtual file system, the client file access transaction into a server file access transaction for access to the file maintained within one of the plurality of server computer systems comprises:

identifying if replicated copies of the file to be modified exist in the virtual file system within a plurality of server file systems of the plurality of server computer systems; and if replicated copies of the file to be modified exist, translating, using the metadata associated with the virtual file system, the client file access transaction into a server file access transaction for access to each copy of the replicated file maintained within the server file systems of the plurality of server computer systems; and wherein forwarding the server file access transaction to a selected one of the plurality of server computer systems specified by the metadata for processing of the file access operation comprises:

forwarding the server file access transaction to each of the plurality of server computer systems specified by the metadata that contains a replicated copy of the file to be modified for processing of the file access operation on each replicated copy of the file.

19. The method of claim 1 wherein translating, using the metadata associated with the virtual file system, the server transaction response into a client file access response comprises:

obtaining a physical file identifier specified in the server transaction response; matching the physical file identifier specified in the server transaction response to a matching forwarding table entry in the at least one forwarding table to identify a corresponding virtual file identifier contained in the matching forwarding table entry;

replacing the physical file identifier specified in the server transaction response with the corresponding virtual file identifier contained in matching forwarding table entry to create the client file access response; and wherein forwarding the client file access response to the client computer system comprises:

obtaining a server transaction identity specified in the server transaction response;

matching the server transaction identity to an active transaction table entry containing that server transaction identity in the an active transaction table to obtain a client transaction identity that corresponds to that server transaction identity; and forwarding the client file access response to a client computer system corresponding to a client computer system associated with the client transaction identity identified in matching active transaction table entry in the active transaction table.

20. The method of claim 1 wherein receiving a client file access transaction comprises:

identifying that the client file access transaction received from the client computer system is a duplicate client file access transaction within the active transaction table;

in response to identifying that the client file access transaction is a duplicate, ignoring the duplicate file access transaction and bypassing processing the client file access transaction in relation to metadata associated with the virtual file system.

21. The method of claim 1 wherein the file access operation specified by the client file access transaction is a metadata-only operation that the adaptive load balancer can perform by accessing the metadata associated with the virtual file system without requiring access to files stored within respective file systems of the plurality of computer systems.

22. The method of claim 21 wherein:

the file access operation in the client file access transaction specifies an operation to be performed on directories and files of the virtual file systems that the adaptive load balancer provides access to using the Network File System protocol; and wherein the file access operation is a Network File System operation including at least one of a CREATE operation, a MKDIR operation, a READDIR operation and a STATFS operation.

23. The method of claim 22 wherein the file access operation is a STATFS operation and wherein accessing metadata associated with the virtual file system to complete processing of the file access operation specified by the client file access transaction comprises:

calculating an amount of storage space associated with each server file system of the plurality of server computer systems that is provided within the virtual file system; and providing a client file access response to the client computer system that indicates an amount of file storage space available for storage of data within the virtual file system that is based on the calculated amount of storage space associated with each server file system.

24. The method of claim 23 wherein calculating an amount of storage space associated with each server file system comprises:

calculating a total amount of current free space within each server file system of the plurality of server computer systems that is provided within the virtual file system;

identifying a replicated amount of storage of replicated files within the set of server file systems maintained by the respective server computer systems within the virtual file system;

calculating a potential amount of total storage space as the total amount of current free space in addition to the replicated amount of storage of replicated files within the set of server file systems; and setting the amount of file storage space available for storage of data within the virtual file system equal to the potential amount of total storage space.

25. The method of claim 1 wherein presenting the virtual file system to the client computer system comprises:

aggregating a set of files and directories accessible in the respective file systems of each of the plurality of server computer systems to appear to client computer systems as the virtual file system;

exposing the set of files and directories aggregated in the virtual file system to client computer systems using a file access protocol compatible with the client computer systems such that virtual file system is presented to client computer systems as a single virtual file system providing a single point of access to the files and directories of the aggregated set of file and directories of each of the plurality of server computer systems.

26. The method of claim 25 wherein the file access protocol in at least one of the Network File System (NFS) protocol and the Common Internet File System (CIFS) protocol and the Hypertext Transfer Protocol and the Simple Object Access Protocol.

27. The method of claim 1, wherein each file is stored entirely by one of the plurality of server file systems and one of the server computer systems.

28. A method for processing client data access transactions, the method comprising:
in an adaptive load balancer, presenting a virtual data system to a client computer system, the virtual data system providing access to an aggregated set of data available from a plurality of server data systems respectively operating within a plurality of server computer systems;
receiving a client data access transaction from the client computer system, the client data access transaction specifying a data access operation to be performed relative to the virtual data system presented to the client computer system;
processing the client data access transaction in relation to metadata associated with the virtual data system, the metadata including translation data, to:
a) access metadata associated with the virtual data system to complete processing of the data access operation specified by the client data access transaction if the data access operation does not involve access to data stored by at least one of the plurality of server data systems; and
b) if the data access operation involves access to data stored by at least one of the plurality of server data systems, then translating, using the metadata, the client data access transaction into a server data access transaction for access to the data maintained within at least one of the plurality of server computer systems according to the data access operation specified by the client data access transaction by:
obtaining a virtual data identifier specified in the client data access transaction;
matching the virtual data identifier specified in the client data access transaction to a matching forwarding table entry in a forwarding table to identify a corresponding physical data identifier from the matching forwarding table entry;
creating the server data access transaction by replacing the virtual data identifier specified in the client data access transaction with the corresponding physical data identifier in the matching forwarding table entry, assigning a server transaction identity to the created server data access transaction, determining if an active transaction table includes an active transaction table entry that corresponds to the client transaction identity, and if not, creating an active transaction table entry including the assigned client transaction identity and an identity of the client computer system from which the client data access transaction was received;
storing the server transaction identity in an active transaction table entry that includes the client transaction identity of the received client data access transaction; and
forwarding the server data access transaction to a selected one of the plurality of server computer systems by identifying, from the matching forwarding table entry, the at least one server computer system at which an instance of that data can be accessed using the corresponding physical data identifier and forwarding the server data access transaction to a server computer system corresponding to the identified at least one server computer system.

29. The method of claim 28 wherein:
the virtual data system is a virtual file system and the server data systems are server file systems respectively associated with each of the plurality of server computer systems;
the aggregated set of data of the virtual file system is a collective set of files stored within each of the server file systems of each of the plurality of server computer systems;
the client data access transaction is a file system request for access to information associated with a file presented to the client computer system within the virtual file system; and
wherein the metadata is information maintained by the adaptive load balancer to map virtual file parameters within file system requests provided from client computer systems for access to information associated with a file presented within the virtual file system to corresponding physical file parameters of an instance of a file in at least one of the server file system maintained by at least one of the server computer systems.

30. The method of claim 28 wherein:
the virtual data system is a virtual web service system and the server data systems are web services data systems respectively associated with each of the plurality of server computer systems;
the aggregated set of data of the virtual data system is a collective set of service objects stored within each of the web services data systems of each of the plurality of server computer systems;
the client data access transaction is a web request for access to information associated with a service object presented to the client computer system within the virtual web service system; and
wherein the metadata is information maintained by the adaptive load balancer to map virtual object parameters within web requests provided from client computer systems for access to information associated with a service object presented within the virtual data system to corresponding physical object parameters of an instance of a service object in at least one of the web services data systems maintained by at least one of the server computer systems.

31. The method of claim 28 wherein the adaptive load balancer services client data transactions and operates in conjunction with the server file systems of each of the server computer systems according to at least one of the NFS protocol and the CIFS protocol.

32. An adaptive load balancer comprising:
a processor;
a memory;
a first communications interface capable of communicating with a client computer system;
a second communications interface capable of communicating with a plurality of server computer systems; and
an interconnection mechanism coupling the processor, the memory, the first communications interface and the second communications interface;
wherein the memory is encoded with an adaptive transaction application that when performed on the processor, produces an adaptive transaction processor that causes the adaptive load balancer to perform the operations of:
presenting a virtual file system to the client computer system via the first communications interface, the virtual file system providing access to an aggregated set of files stored by a plurality of server file systems respectively associated with the plurality of server computer systems;

receiving a client file access transaction from the client computer system via the first communications interface, the client file access transaction specifying a file access operation to be performed relative to the virtual file system presented to the client computer system;

processing the client file access transaction in relation to metadata encoded in the memory associated with the virtual file system, the metadata including translation data, to:

a) access the metadata in the memory associated with the virtual file system to complete processing of the file access operation specified by the client file access transaction if the file access operation does not involve accessing a file stored by at least one of the plurality of server file systems; and b) if the file access operation involves accessing a file stored by at least one of the plurality of server file systems, then translating, using the metadata, the client file access transaction into a server file access transaction for access to the file maintained within at least one of the plurality of server computer systems according to the file access operation specified by the client file access transaction by:

obtaining a virtual file identifier specified in the client file access transaction;

matching the virtual file identifier specified in the client file access transaction to a matching forwarding table entry in a forwarding table to identify a corresponding physical file identifier from the matching forwarding table entry;

creating the server file access transaction by replacing the virtual file identifier specified in the client file access transaction with the corresponding physical file identifier in the matching forwarding table entry, assigning a server transaction identity to the created server file access transaction, determining if an active transaction table includes an active transaction table entry that corresponds to the client transaction identity, and if not, creating an active transaction table entry including the assigned client transaction identity and an identity of the client computer system from which the client file access transaction was received;

storing the server transaction identity in an active transaction table entry that includes the client transaction identity of the received client file access transaction; and forwarding the server file access transaction to a selected one of the plurality of server computer systems by identifying from the matching forwarding table entry, the at least one server computer system at which an instance of that file can be accessed using the corresponding physical file identifier and forwarding the server file access transaction to a server computer system corresponding to the identified at least one server computer system.

33. The adaptive load balancer of claim 32 wherein operation of the adaptive transaction processor causes the adaptive load balancer to determine if the file access operation requires access to a file stored by the plurality of server file systems, and if so, causes the adaptive load balancer to perform the operations of:

forwarding the server file access transaction over the second communications interface to a selected one of the plurality of server computer systems specified by the metadata for processing of the file access operation specified by the client file access transaction by the selected one of the plurality of server computer systems;

receiving, via the second communications interface, a server transaction response from the server computer system to which the server file access transaction was forwarded;

translating, using the metadata associated with the virtual file system in the memory, the server transaction response into a client file access response; and forwarding, over the first communications interface, the client file access response to the client computer system from which the client file access transaction was received.

34. A computer readable medium having computer executable instructions stored thereon which when executed by at least one processor of an adaptive load balancer cause the processor to process client data access transactions via operations comprising:

in an adaptive load balancer, presenting a virtual data system to a client computer system, the virtual data system providing access to an aggregated set of data available from a plurality of server data systems respectively operating within a plurality of server computer systems;

receiving a client data access transaction from the client computer system, the client data access transaction specifying a data access operation to be performed relative to the virtual data system presented to the client computer system;

processing the client data access transaction in relation to metadata associated with the virtual data system, the metadata including translation data, to:

a) access metadata associated with the virtual data system to complete processing of the data access operation specified by the client data access transaction if the data access operation does not involve access to data stored by at least one of the plurality of server data systems; and b) if the data access operation involves access to data stored by at least one of the plurality of server data systems, then translating, using the metadata, the client data access transaction into a server data access transaction for access to the data maintained within at least one of the plurality of server computer systems according to the data access operation specified by the client data access transaction by:

obtaining a virtual data identifier specified in the client data access transaction;

matching the virtual data identifier specified in the client data access transaction to a matching forwarding table entry in a forwarding table to identify a corresponding physical data identifier from the matching forwarding table entry;

creating the server data access transaction by replacing the virtual data identifier specified in the client data access transaction with the corresponding physical data identifier in the matching forwarding table entry, assigning a server transaction identity to the created server data access transaction, determining if an active transaction table includes an active transaction table entry that corresponds to the client transaction identity, and if not, creating an active transaction table entry including the assigned client transaction identity and an identity of the client computer system from which the client data access transaction was received;

storing the server transaction identity in an active transaction table entry that includes the client transaction identity of the received client data access transaction; and forwarding the server data access transaction to a selected one of the plurality of server computer systems by identifying, from the matching forwarding table entry, the at least one server computer system at which an instance of that data can be accessed using the corresponding physical data identifier and forwarding the server data access transaction to a server computer system corresponding to the identified at least one server computer system.

35. The computer readable medium of claim 34 further having computer executable instructions stored thereon which when executed by the at least one processor of the adaptive load balancer cause the processor to determine if the file access operation requires access to a file stored by the plurality of server file systems, and if so, to cause the processor to perform the operations of:

forwarding the server file access transaction to a selected one of the plurality of server computer systems specified by the metadata for processing of the file access operation specified by the client file access transaction by the selected one of the plurality of server computer systems;

receiving a server transaction response from the server computer system to which the server file access transaction was forwarded;

translating, using the metadata associated with the virtual file system, the server transaction response into a client file access response; and forwarding the client file access response to the client computer system from which the client file access transaction was received.

* * * * *